(12) United States Patent
Hamada et al.

(10) Patent No.: US 10,386,253 B2
(45) Date of Patent: Aug. 20, 2019

(54) VEHICLE WHEEL SUPPORTING ROLLING BEARING UNIT

(71) Applicant: NSK LTD., Tokyo (JP)

(72) Inventors: Hiroki Hamada, Fujisawa (JP); Yasuyuki Matsuda, Fujisawa (JP); Masafumi Hikida, Fujisawa (JP); Hiroshi Kawahara, Fujisawa (JP); Daisuke Gunji, Fujisawa (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/771,313

(22) PCT Filed: Oct. 27, 2016

(86) PCT No.: PCT/JP2016/081822
§ 371 (c)(1),
(2) Date: Apr. 30, 2018

(87) PCT Pub. No.: WO2017/073646
PCT Pub. Date: May 4, 2017

(65) Prior Publication Data
US 2018/0313708 A1    Nov. 1, 2018

(30) Foreign Application Priority Data

Oct. 27, 2015   (JP) .................................. 2015-210715
Dec. 4, 2015    (JP) .................................. 2015-237378

(51) Int. Cl.
*F16C 41/00*       (2006.01)
*G01L 5/00*        (2006.01)
(Continued)

(52) U.S. Cl.
CPC ........ *G01L 5/0023* (2013.01); *B60B 27/0005* (2013.01); *B60B 27/0068* (2013.01);
(Continued)

(58) Field of Classification Search
CPC ...... F16C 19/18; F16C 19/181; F16C 19/184; F16C 19/185; F16C 19/186; F16C 19/187;
(Continued)

(56) References Cited

U.S. PATENT DOCUMENTS

2006/0107765 A1* 5/2006 Sentoku ................ G01L 5/0009
73/862.322
2006/0108170 A1 5/2006 Ishikawa et al.
(Continued)

FOREIGN PATENT DOCUMENTS

DE        10141252 C1     4/2003
DE    102009039758 A1     7/2010
(Continued)

OTHER PUBLICATIONS

International Search Report dated Nov. 22, 2016 by the International Searching Authority in counterpart International Patent Application No. PCT/JP2016/081822. (PCT/ISA/210).
(Continued)

*Primary Examiner* — Phillip A Johnson
(74) *Attorney, Agent, or Firm* — Sughrue Mion, PLLC

(57) ABSTRACT

A vehicle wheel supporting rolling bearing unit includes a stationary side bearing ring member, a rotation side bearing ring member, and plural rolling elements. The rotation side bearing ring member is provided with a first acceleration sensor, a second acceleration sensor, and a third acceleration sensor which are fixed on a virtual plane orthogonal to a center axis of the rotation side bearing ring member. The first acceleration sensor and the second acceleration sensor are arranged on a virtual line passing through a rotation center of the rotation side bearing ring member with a same distance from the rotation center while detection directions thereof are directed in a radial direction and are opposite to each other in the radial direction. The third acceleration sensor is arranged such that a detection direction thereof is non-parallel to the detection directions of the first acceleration sensor and the second acceleration sensor.

8 Claims, 17 Drawing Sheets

(51) Int. Cl.
  *B60B 35/02*    (2006.01)
  *F16C 19/18*    (2006.01)
  *G01P 15/18*    (2013.01)
  *B60B 27/00*    (2006.01)
  *F16C 19/52*    (2006.01)

(52) U.S. Cl.
  CPC .............. *B60B 35/02* (2013.01); *F16C 19/18* (2013.01); *F16C 41/00* (2013.01); *G01L 5/00* (2013.01); *G01P 15/18* (2013.01); *B60B 27/0026* (2013.01); *F16C 19/186* (2013.01); *F16C 19/522* (2013.01); *F16C 2326/02* (2013.01)

(58) Field of Classification Search
  CPC ...... F16C 19/386; F16C 19/522; F16C 41/00; F16C 2326/02; B60B 27/0005; B60B 27/001; B60B 27/0068; G01P 15/005; G01P 15/0019; G01P 15/0023; G01P 15/18
  See application file for complete search history.

(56) References Cited

U.S. PATENT DOCUMENTS

| | | |
|---|---|---|
| 2006/0153482 A1 | 7/2006 | Koike et al. |
| 2006/0228063 A1 | 10/2006 | Sentoku et al. |
| 2007/0065060 A1 | 3/2007 | Koike et al. |
| 2009/0108188 A1 | 4/2009 | Urabe |
| 2009/0199660 A1* | 8/2009 | Ozaki .................... B60B 27/00 73/862.381 |
| 2012/0014632 A1* | 1/2012 | Nishikawa ........... G01L 5/0019 384/448 |
| 2012/0153135 A1 | 6/2012 | Ishizuka |
| 2014/0212081 A1* | 7/2014 | Takahashi ........... B60B 27/0068 384/448 |

FOREIGN PATENT DOCUMENTS

| | | |
|---|---|---|
| JP | 2005-43336 A | 2/2005 |
| JP | 2006-292489 A | 10/2006 |
| JP | 2008-82958 A | 4/2008 |
| JP | 4627108 B2 | 2/2011 |
| JP | 2012-127818 A | 7/2012 |
| JP | 2013-181964 A | 9/2013 |
| JP | 5508124 B2 | 5/2014 |
| JP | 5589793 B2 | 9/2014 |

OTHER PUBLICATIONS

Written Opinion dated Nov. 22, 2016 by the International Searching Authority in counterpart International Patent Application No. PCT/JP2016/081822. (PCT/ISA/237).
Communication dated Aug. 20, 2018, issued by the European Patent Office in counterpart European Patent Application No. 16859875.3.

* cited by examiner

VEHICLE WHEEL SUPPORTING ROLLING BEARING UNIT

TECHNICAL FIELD

The present invention relates to an improvement of a vehicle wheel supporting rolling bearing unit used for a suspension device rotatably supporting a vehicle wheel of an automobile.

BACKGROUND ART

In recent years, various vehicle control systems, such as ABS (anti-lock brake system), TCS (traction control system), and VSC (vehicle stability control) have been developed, in order to secure traveling stability and traveling safety of an automobile. In order to control the vehicle control systems, it is required to accurately detect a situation (for example, rotational speed, a load, temperature, or the like) of a traveling tire.

In view of these circumstances, for example Patent Document 1 discloses a technique to obtain force (ground contact load) acting on a tire by providing a load sensor in a rolling bearing unit used for a suspension device rotatably supporting a vehicle wheel. According to this technique, the load acting on the traveling tire can be obtained so as to control an attitude of an automobile.

However, as described above, when the load acting on the tire is obtained using the load sensor provided in the rolling bearing unit, the load detected by the load sensor provided in the rolling bearing unit does not match the load actually acting on the tire in a state where a brake (braking force) is acting. This is because, in the state where the brake is acting, there are two paths, through which the load acting on the tire is transmitted to a vehicle body. One is "Tire ->Rolling Bearing Unit ->Vehicle Body", and the other is "Tire ->Brake Device ->Vehicle Body". The load sensor provided in the rolling bearing unit can only detect the load transmitted to the former path.

On the other hand, if acceleration of the tire (translational acceleration in an upper-lower direction) can be measured, the load acting on the tire can be obtained regardless of an operating state of the brake. However, in a case where an acceleration sensor is directly provided on the tire, it is necessary to re-attach the acceleration sensor at the time of periodically required tire replacement, resulting in a cost increase. There has been known that members (hereinafter, referred to as "unsprung members") such as the vehicle wheel (the tire and a wheel), the rolling bearing unit, a brake part, a knuckle, and a suspension upright, which are provided below springs configuring suspension of the automobile, move together with the tire in the upper-lower direction. The inventors of the present invention have found that among the unsprung members, as long as the translational acceleration acting on the rolling bearing unit, unlike the tire which requires periodic replacement, can be measured, the load acting on the tire can be obtained regardless of the operating state of the brake, while suppressing the cost increase.

PRIOR ART DOCUMENT

Patent Document

Patent Document 1: JP-A-2005-43336
Patent Document 2: JP-A-2008-82958
Patent Document 3: JP-A-2012-127818
Patent Document 4: JP-A-2013-181964

SUMMARY OF THE INVENTION

Problems to be Solved by the Invention

In view of the above circumstances, an aspect of the present invention provides a structure capable of obtaining translational acceleration acting on a vehicle wheel supporting rolling bearing unit.

Means for Solving the Problems

A vehicle wheel supporting rolling bearing unit according to an embodiment of the present invention rotatably supports a vehicle wheel (a tire and a wheel) by a suspension device, and includes an outer diameter side bearing ring member, an inner diameter side bearing ring member, and a plurality of rolling elements.

The outer diameter side bearing ring member is, for example, formed in a substantially annular shape (cylindrical shape), and has one or a plurality of (for example, double rows) outer ring raceways on an inner peripheral surface.

The inner diameter side bearing ring member is, for example, formed in a substantially cylindrical shape or substantially annular shape (cylindrical shape), is arranged at a radially inner side of the outer diameter side bearing ring member, and has one or a plurality of (for example, double rows) inner ring raceways on an outer peripheral surface.

Each of the rolling elements can, for example, be a ball, or a roller (including a tapered roller, a cylindrical roller, a needle, and a spherical roller), and is rollably provided between the outer ring raceway and the inner ring raceway.

Further, one of the outer diameter side bearing ring member and the inner diameter side bearing ring member is a stationary side bearing ring member which is supported and fixed to the suspension device and non-rotatable in a use state, and the other bearing ring member is a rotation side bearing ring member which is coupled and fixed to the vehicle wheel and is configured to rotate together with the vehicle wheel.

In particular, in an embodiment of the present invention, a part of the rotation side bearing ring member is provided with at least three acceleration sensors including a first acceleration sensor, a second acceleration sensor, and a third acceleration sensor which are fixed on a virtual plane orthogonal to a center axis of the rotation side bearing ring member. In other words, a plurality of acceleration sensors capable of detecting acceleration in three or more directions in total are fixed.

The first acceleration sensor and the second acceleration sensor are arranged on a virtual line passing through a rotation center of the rotation side bearing ring member, with a same distance from the rotation center. In this state, a detection direction of the first acceleration sensor and a detection direction of the second acceleration sensor are directed in a radial direction (radiation direction) of the rotation side bearing ring member (aligned with the virtual line) and are opposite to each other in the radial direction.

The third acceleration sensor is arranged such that a detection direction thereof is non-parallel to the detection directions of the first acceleration sensor and the second acceleration sensor (linearly independent direction).

Although an attachment position of the third acceleration sensor is not particularly limited, a relative position in a circumferential direction with respect to the first acceleration sensor (or the second acceleration sensor) and a distance from the rotation center are necessary to obtain translational acceleration, and therefore, those are predetermined from design.

In the above configuration, the detection direction of the third acceleration sensor may be arranged to be directed in the radial direction of the rotation side bearing ring member.

In the above configuration, the third acceleration sensor may be arranged on a second virtual line which passes through the rotation center and is orthogonal to the virtual line on which the first acceleration sensor and the second acceleration sensor are arranged.

Preferably, the distance from the rotation center to the third acceleration sensor may be equal to the distance from the rotation center to the first and second acceleration sensors.

Further preferably, the third acceleration sensor and a fourth acceleration sensor may be arranged on the second virtual line with a same distance from the rotation center in a state where detection directions thereof are directed in the radial direction (radiation direction) of the rotation side bearing ring member (aligned with the second virtual line) and are opposite to each other in the radial direction.

In the above configuration, the vehicle wheel supporting rolling bearing unit may further include a rotation angle detection device configured to detect a rotation angle of the rotation side bearing ring member.

The rotation angle detection device may be a known rotary encoder having various structures, for example, an absolute type (absolute value detection type) encoder such as a reflection type optical encoder, and a magnetic type encoder, an incremental type encoder, or the like.

In the above configuration, the vehicle wheel supporting rolling bearing unit may further include a generator which includes a stator and a rotator concentrically arranged with each other and is configured to generate electric power to be supplied to each of the acceleration sensors (and a strain sensor, the acceleration sensor, an air pressure sensor, a wear sensor, a temperature sensor, or the like provided on the vehicle wheel) based on relative rotation between the stator and the rotator.

In this case, the stator may be supported and fixed directly or indirectly with respect to the stationary side bearing ring member, and the rotator may be supported and fixed directly or indirectly with respect to the rotation side bearing ring member.

Alternatively, instead of the above generator, an electromagnetic induction type or a resonance type wireless power supply device may be provided.

In the above configuration, the vehicle wheel supporting rolling bearing unit may further include a battery configured to store the electric power generated by the generator.

In the above configuration, the vehicle wheel supporting rolling bearing unit may further include a charger which supplies the electric power generated by the electric generator to the battery and is configured to charge the battery.

The charger may include a rectifier circuit which converts an AC voltage generated by the generator into a DC voltage. The charger (circuit) may be provided in the same space with a wireless communication device or may be provided separately from the wireless communication device.

Further, in the above configuration, the vehicle wheel supporting rolling bearing unit may further include a wireless communication device which wirelessly communicates a signal (optionally including an signal indicating, for example, a traveling state of the vehicle transmitted from a vehicle body side, an operating state of an engine, or the like) including an output signal of the acceleration sensor between electronic equipment arranged at the vehicle body side.

In the case of providing the above wireless communication device, for example, an axially inner end opening portion of the stationary side bearing ring member may be closed by a cover. A portion of the cover which faces an antenna configuring the wireless communication device may be made of radio wave transmissive resin (also including fiber reinforced resin) such as ABS resin (acrylonitrile, butadiene, styrene copolymerized synthetic resin) or AS resin (acrylonitrile, styrene copolymer (copolymerization compound)).

Further, in the above configuration, a through hole may be formed in a center portion of the inner diameter side bearing ring member (the entire inner diameter side bearing ring member is formed in a hollow cylindrical shape). Further, at least one member of the acceleration sensors (acceleration measuring device), the electric generator, the battery, and the wireless communication device may be arranged in the through hole.

In the above configuration, for the outer diameter side bearing ring member and the inner diameter side bearing ring member, an inner ring rotation type structure may be adopted in which the inner diameter side bearing ring member is the rotation side bearing ring member, and the outer diameter side bearing ring member is the stationary side bearing ring member. On the contrary, an outer ring rotation type structure may also be adopted in which the inner diameter side bearing ring member is the stationary side bearing ring member, and the outer diameter side bearing ring member is the rotation side bearing ring member.

Although the vehicle wheel supporting rolling bearing unit may adopt either a structure for a driven wheel or a structure for a driving wheel, in the case of including the battery or the like, it is preferable to adopt the structure for a driven wheel from the viewpoint of securing an accommodation space thereof. Incidentally, in the case of adopting the inner ring rotating type structure for a driving wheel, a drive shaft needs to be inserted in an engagement hole (through hole) formed at the center portion of the inner diameter side bearing ring member, and therefore, for example, the battery may be provided in a space axially outward than an axially outer end portion (tip end portion) of the drive shaft, and the electric generator may be provided around the drive shaft.

Effect of the Invention

According to the vehicle wheel supporting rolling bearing unit configured as described above, it is possible to measure translational acceleration acting on the bearing unit.

That is, in the above configuration, a part of the rotation side bearing ring member rotating together with the vehicle wheel is provided with at least three acceleration sensors which are fixed on a virtual plane orthogonal to the center axis of the rotation side bearing ring member. The first acceleration sensor and the second acceleration sensor among these acceleration sensors are arranged on a virtual line passing through the rotation center of the rotation side bearing ring member with the same distance from the rotation center in a state where the detection directions thereof are directed in the radial direction of the rotation side bearing ring member and are opposite to each other in the radial direction.

Since a magnitude of centrifugal acceleration and a magnitude of the translational acceleration (the magnitude of the translational acceleration in an output signal) acting on the first acceleration sensor and the second acceleration sensor arranged in this manner are respectively equal to each other, by perform subtraction between an output signal of the first acceleration sensor and the output signal of the second acceleration sensor, it is possible to obtain the centrifugal acceleration acting equally on the first and second acceleration sensors. Therefore, it is possible to obtain the magnitude of the centrifugal acceleration and the magnitudes of components in the detection directions of these first and second acceleration sensors in the translational acceleration, acting on the first and second acceleration sensors.

Further, in the above configuration, the third acceleration sensor is arranged on the virtual plane in the state where the detection direction thereof is non-parallel to the detection directions of the first acceleration sensor and the second acceleration sensor.

The magnitude of centrifugal acceleration acting on the third acceleration sensor arranged in this manner can be obtained by using the magnitudes of the centrifugal acceleration acting on the first and second acceleration sensors obtained as described above, and a ratio between the distance from the rotation center to the third acceleration sensor and the distances from the rotation center to the first and second acceleration sensors. Accordingly, it is possible to obtain the magnitude of a component (consequently, a component orthogonal to the detection directions of the first and second acceleration sensors) in the detection direction of the third acceleration sensor in the translational acceleration, from an output signal of the third acceleration sensor.

As a result, a magnitude of the translational acceleration acting on the vehicle wheel supporting rolling bearing unit can be obtained based on the magnitudes of the translational acceleration of the components in the detection directions of the first and second acceleration sensors, which are obtained from the first and second acceleration sensors, and the magnitude of the translational acceleration of the component in the detection direction of the third acceleration sensor, which is obtained from the third acceleration sensor.

DESCRIPTION OF EMBODIMENTS

[First Embodiment]

Figure 1:
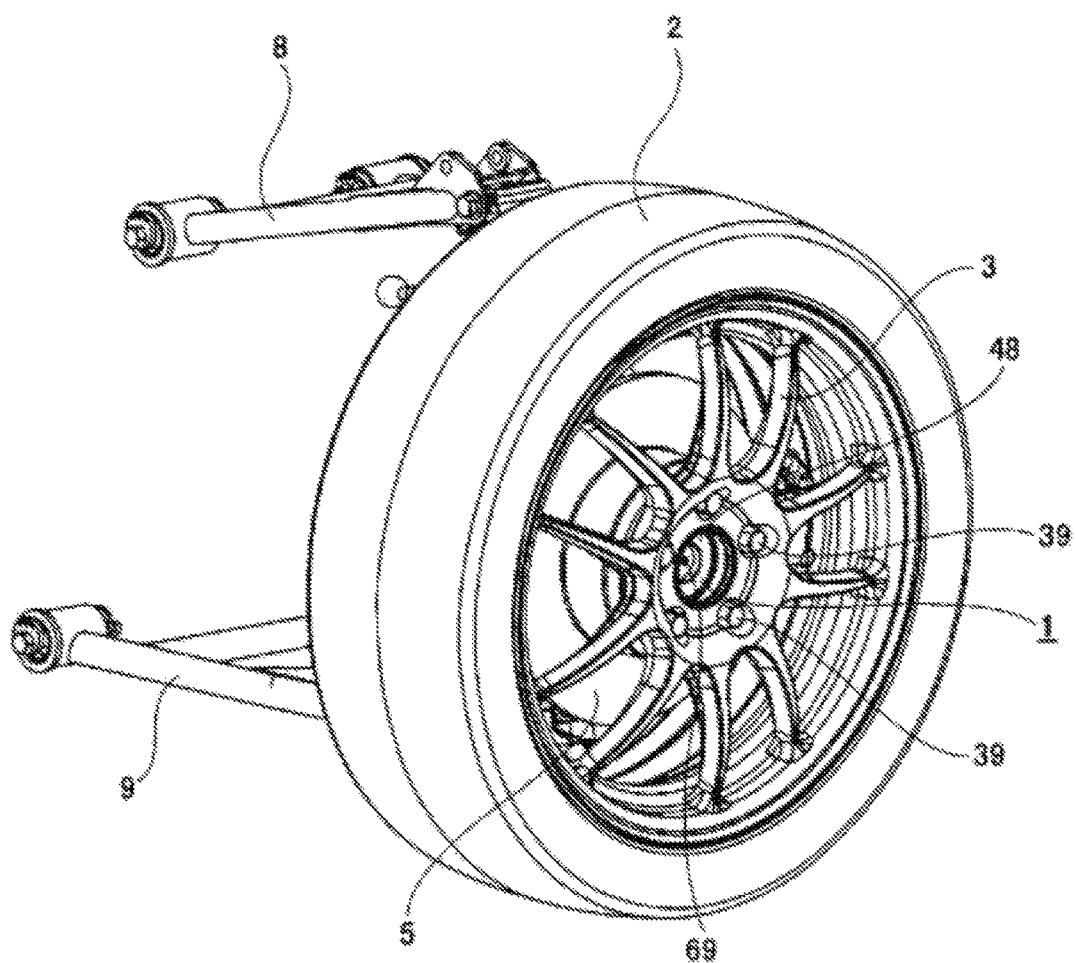
FIG. 1 is a perspective view of a vehicle wheel supporting structure in which a vehicle wheel is supported to a suspension device by a vehicle wheel supporting rolling bearing unit according to a first embodiment of the present invention as viewed from an outer side in an axial direction.
Figure 2:
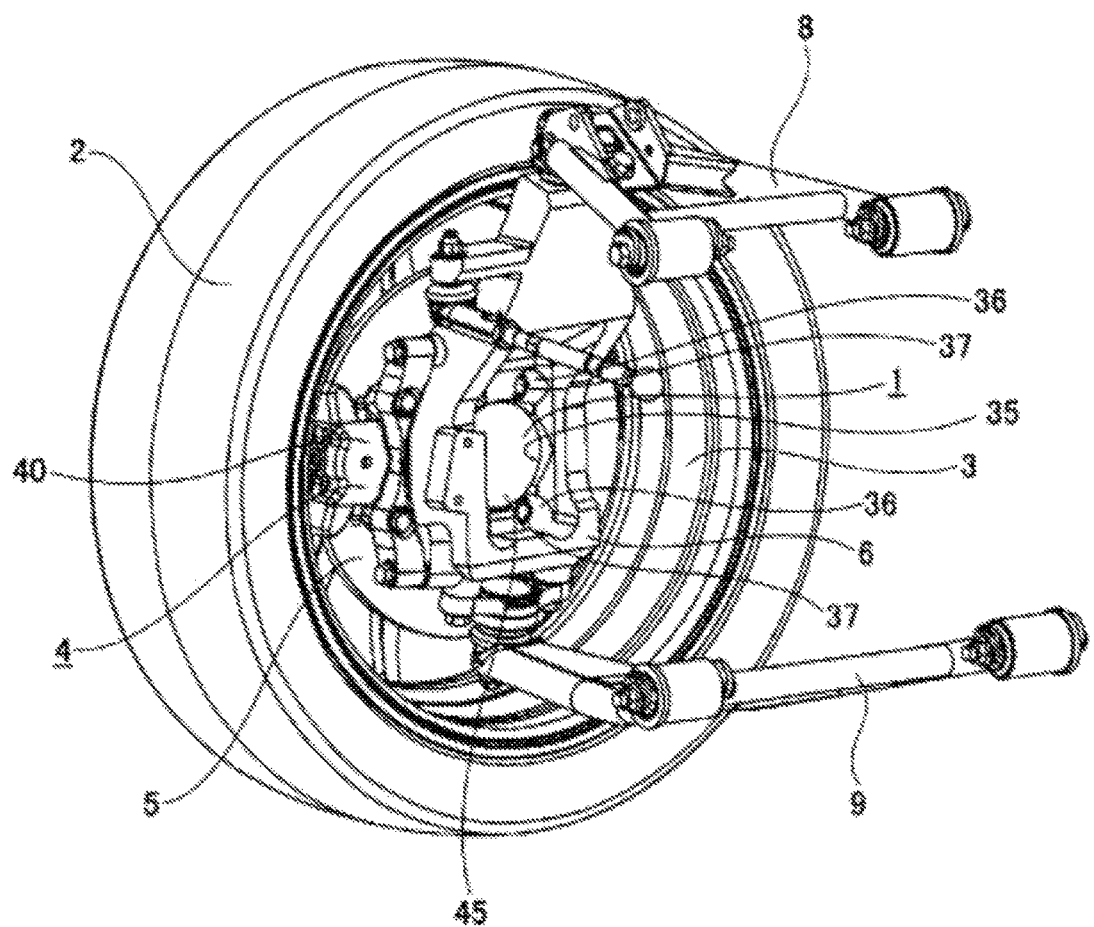
FIG. 2 is a perspective view of the vehicle wheel supporting structure as viewed from an inner side in the axial direction.
Figure 3:
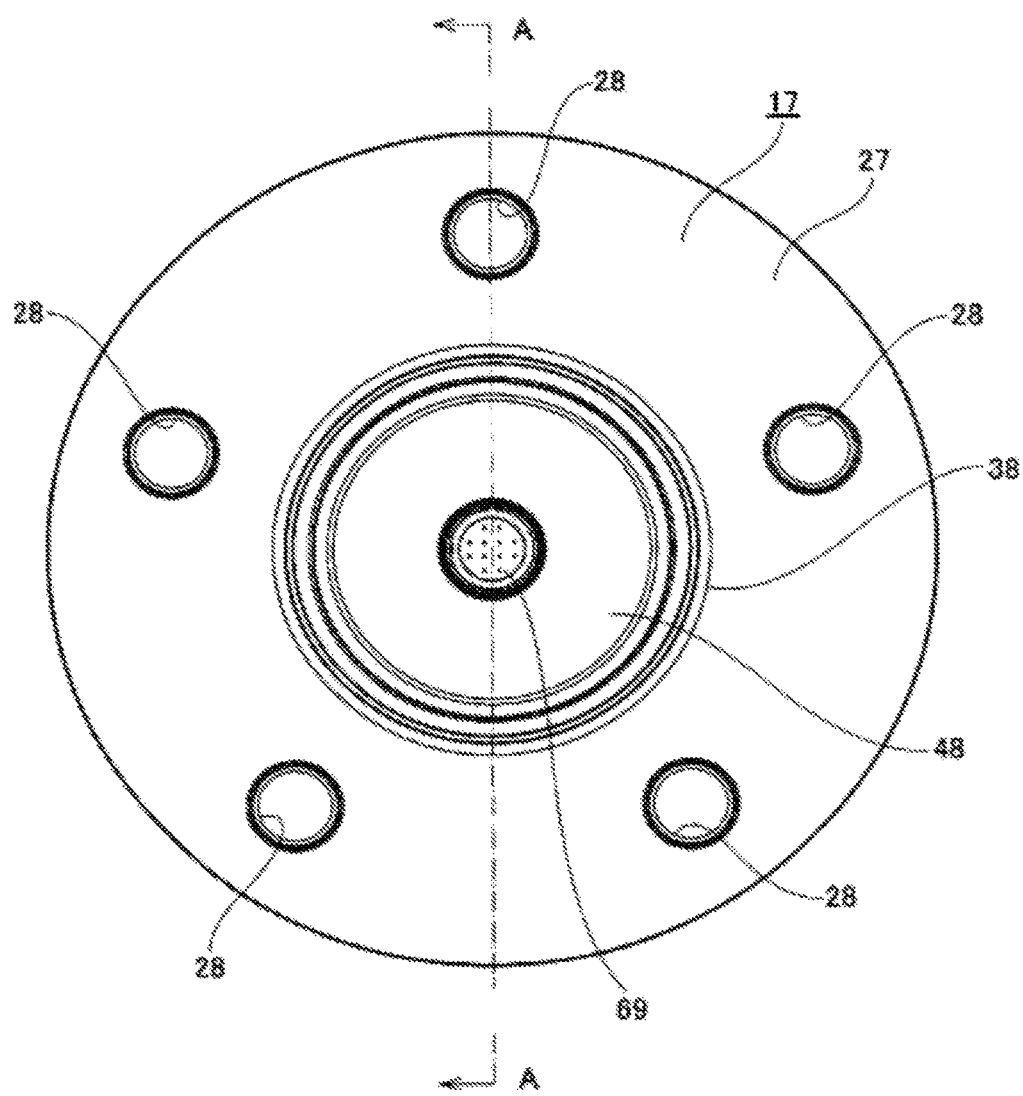
FIG. 3 is a front view showing the vehicle wheel supporting rolling bearing unit which is taken out from the vehicle wheel supporting structure as viewed from the outer side in the axial direction.

A first embodiment of the present invention will be described with reference to FIGS. 1 to 6.

A vehicle wheel supporting rolling bearing unit (hereinafter, referred to as "bearing unit") 1 according to the present embodiment is used for a driven wheel, and rotatably supports a tire 2 and a wheel 3 configuring a vehicle wheel of an automobile, and a rotor 5 configuring a disc brake device 4 which is a braking device with respect to a knuckle 6 configuring a suspension device. In the illustrated structure, the knuckle 6 is supported by an upper arm 8 and a lower arm 9 which are supported to a vehicle body 7 (refer to FIG. 4) in a pivotably displaceable manner.

The bearing unit 1 includes a bearing part 10 having a bearing function, an acceleration measuring device 11 having a translational acceleration measuring function, an electric generator 12 having a power generation function, a wireless communication device 13 having a wireless communication function, a battery 14 having an electricity storage function, and a charger 15 having a charging function.

The bearing part 10 rotatably supports the tire 2 and the wheel 3 with respect to the knuckle 6, and includes an outer ring 16 which is an outer diameter side bearing ring member, a hub 17 which is an inner diameter side bearing ring member, and a plurality of balls 18, 18.

The outer ring 16 is formed in a substantially annular shape as a whole, and has double-row outer ring raceways 19a, 19b on an inner peripheral surface and a stationary side flange 20 at an inner end side portion of an axially intermediate portion of an outer peripheral surface. The stationary side flange 20 is provided with a plurality of attachment holes (screw holes or through holes) 21, 21 penetrating axially therethrough.

Figure 4:
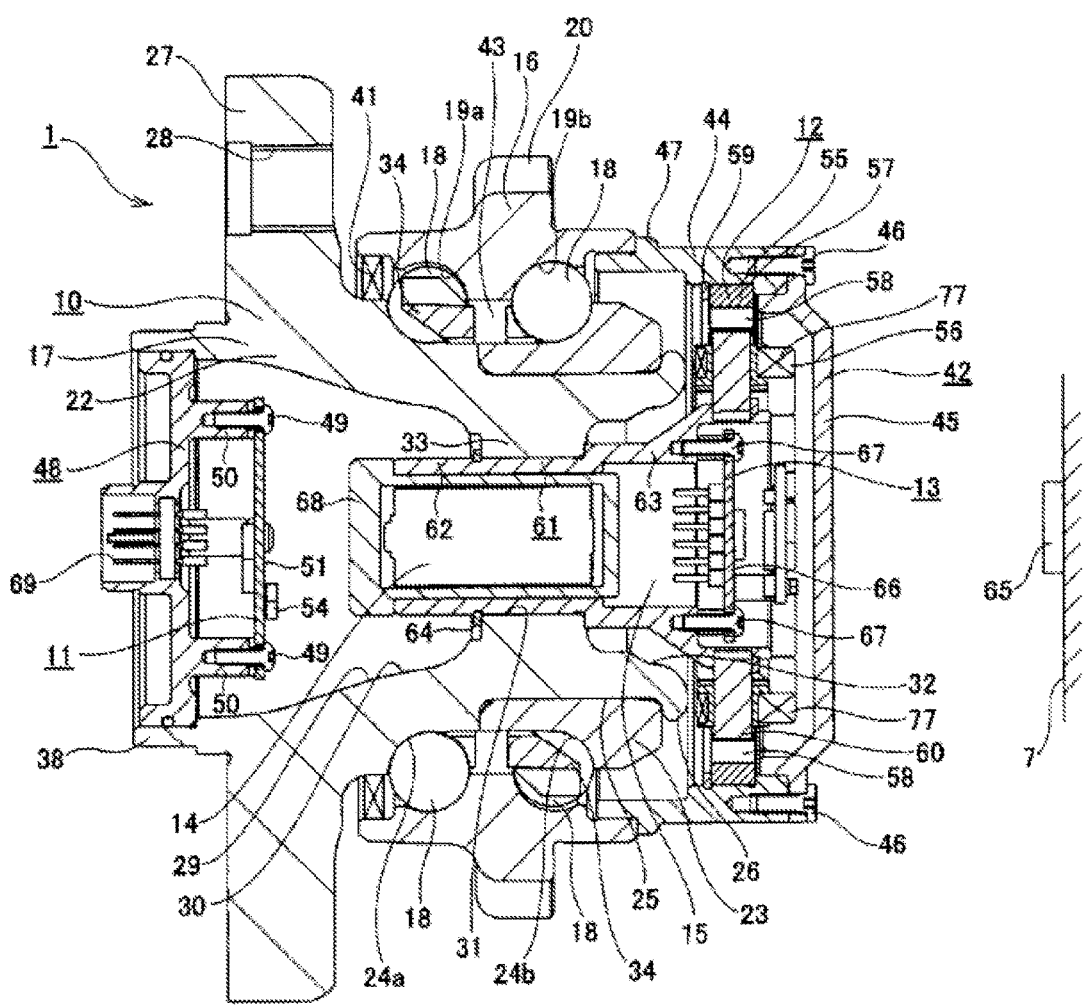
FIG. 4 is a sectional view of the vehicle wheel supporting structure taken along a line A-A of FIG. 3.
Figure 5:
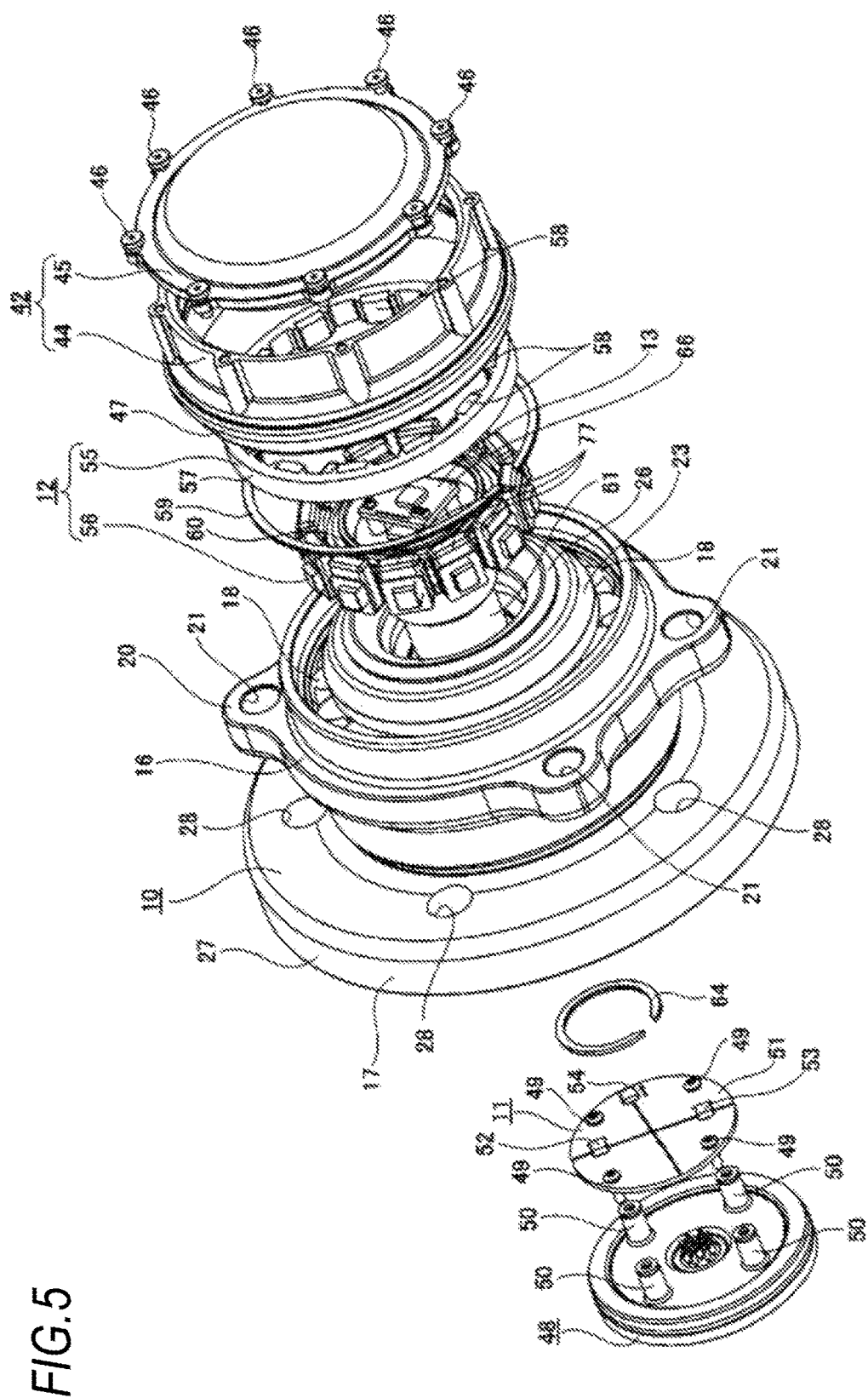
FIG. 5 is an exploded perspective view of the vehicle wheel supporting structure.

Incidentally, in the present specification and claim, "inward" with respect to the axial direction refers to a right side in FIG. 4, which is a center side in a width direction of a vehicle when being assembled to the vehicle. On the contrary, a left side in FIG. 4, which is at an outer side in the width direction of the vehicle, is referred to as "outward" with respect to the axial direction.

The hub 17 is formed by combining a hub body 22 and an inner ring 23, has double-row inner ring raceways 24a, 24b on an outer peripheral surface, and is supported concentrically with the outer ring 16 on an inner diameter side of the outer ring 16. Specifically, the inner ring raceway 24a in an axially outer side row is formed directly at an axially intermediate portion of the outer peripheral surface of the hub body 22, and the inner ring 23 formed with the inner ring raceway 24b in an axially inner side row on the outer peripheral surface is externally fitted and fixed to a small-diameter step part 25 similarly formed in an axially inner end side portion. An axially inner end surface of the inner ring 23 is pressed by a crimping part 26 formed by plastically deforming an axially inner end portion of the hub body 22 radially outward. At an axially outer end portion of the hub body 22, a rotation side flange 27 configured to support the vehicle wheel is provided in a portion protruding axially outward than an axially outer end opening portion of the outer ring 16. Further, the rotation side flange 27 is formed with coupling holes (screw holes or through holes) 28, 28 penetrating axially therethrough.

Incidentally, when implementing the present invention, a male screw part may be formed at a portion of the hub body which protrudes axially inward than a portion to which the inner ring is externally fitted and fixed, and the inner ring may be supported and fixed to the hub body by screwing a nut into the male screw part and tightening it further.

Particularly, in the present embodiment, a center portion of the hub body 22 is provided with a through hole 29 penetrating axially therethrough. The through hole 29 is configured by an outer end side large-diameter part 30 provided from the axially outer end portion to the intermediate portion, a small-diameter part 31 provided at the inner end side portion of the axially intermediate portion, and an inner end side large-diameter part 32 provided at the axially inner end portion. In the present embodiment, a circular ring-shaped inward flange part 33 protruding radially inward than a portion adjacent to both axial sides is formed over the entire circumference on an inner peripheral surface of the inner end side portion of the axially intermediate portion of the hub body 22, so that the through hole 29 is divided into the outer end side large-diameter part 30, the small-diameter part 31 and the inner end side large-diameter part 32. Further, the outer end side large-diameter part 30 is formed in a substantially trapezoidal cross section shape in which an inner diameter dimension gradually increases toward an axially outward direction, while the inner end side large-diameter part 32 is formed in the substantially trapezoidal cross section shape in which the inner diameter dimension gradually increases toward an axially inward direction. In the present embodiment, as described later, the acceleration measuring device 11, the battery 14, and the charger 15 described above are arranged in the through hole 29.

While being held by cages 34, 34 respectively for each of two rows, the balls 18, 18 are rollably provided between the double outer ring raceways 19a, 19b and the double inner ring raceways 24a, 24b in a state where a preload is applied with a contact angle of a back to back arrangement type. In the illustrated example, diameters, pitch circle diameters, and the contact angles are set to be equal to each other between the both rows of the balls 18. However, when implementing the present invention, the diameters of the both rows of the balls need not necessarily be the same. For example, by making the diameters of the balls configuring an inner side (axially inner side) ball row larger than those of the balls configuring an outer side (axially outer side) ball row, and the pitch circle diameter of the outer side ball row larger than that of the inner side ball row, it is also possible to secure a larger volume of a space of the outer end side large-diameter part (increase a capacity of the battery to be accommodated therein).

In order to support and fix the outer ring 16 to the knuckle 6, a portion (knuckle side pilot part) of the outer ring 16 provided axially inward of the stationary side flange 20 is inserted into a circular support hole 35 formed in the knuckle 6, and an axially inner side surface of the stationary side flange 20 is abutted against an axially outer end surface of the knuckle 6. In this state, coupling members (bolts) 37, 37 are respectively screwed into or inserted through a plurality of knuckle side attachment holes (through holes or screw holes) 36, 36 provided in the knuckle 6 and the attachment holes 21, 21 which are provided at positions aligned with each other, and further tightened up. Accordingly, the outer ring 16 is supported and fixed to the knuckle 6. That is, in the present example, the outer ring 16 corresponds to the stationary side bearing ring member described in the claims.

On the other hand, the wheel 3 configuring the vehicle wheel and the rotor 5 are coupled and fixed to the rotation side flange 27. Therefore, a positioning cylinder part 38 called a pilot part provided at the axially outer end portion of the hub body 22 is successively inserted (internally fitted) into a rotor center hole provided in a center portion of the rotor 5 and a wheel center hole provided in a center portion of the wheel 3. Therefore, in a state where the wheel 3 and rotor 5 are positioned in the radial direction, coupling members 39, 39 are respectively screwed into or inserted through the coupling holes 28, 28, a wheel coupling hole formed in the wheel 3, and a rotor coupling hole formed in the rotor 5, which are provided at positions aligned with each other, and further tightened up. Accordingly, the wheel 3 and the rotor 5 are coupled and fixed to an axially outer end surface of the rotation side flange 27. That is, in the present embodiment, the hub 17 corresponds to a rotation side bearing ring member described in the claims.

The wheel 3 is formed of an aluminum alloy in the illustrated example, and includes a disk part coupled and fixed to the axially outer side surface of the rotation side flange 27 and a cylindrical rim part provided on an outer peripheral edge portion of the disk part. The tire 2 is supported and fixed around the rim part. On the other hand, the rotor 5 has a crank shaped cross section, and is formed in a circular ring plate shape as a whole. Further, the rotor 5 includes a hat part provided at an inner diameter side portion and coupled and fixed to the axially outer side surface of the rotation side flange 27, and a sliding part provided at an outer diameter side portion and clamped by a pair of pads supported on a caliper 40 configuring the disc brake device 4 during braking operation.

In the bearing unit 1 according to the present embodiment, a seal ring 41 is provided between the axially outer end opening portion of the outer ring 16 and an outer peripheral surface of the axially intermediate portion of the hub body 22, and a bottomed cylindrical cover 42 is mounted to an axially inner end opening portion of the outer ring 16. Thereby, grease sealed in an internal space 43 where the balls 18, 18 are provided is prevented from leaking into an external space, and foreign matters in the external space are prevented from entering the internal space 43.

The cover 42 is configured by coupling a cylindrical support cylinder part 44 and a disk-like bottom part 45 which closes an axially inner end opening portion of the support cylinder part 44 with a plurality of bolts 46, 46, and an axially outer end portion of the support cylinder part 44 is internally fitted and fixed to an inner peripheral surface of an axially inner end portion of the outer ring 16. An outward flange part 47 provided at an axially outer end side portion of the support cylinder part 44 is abutted against the axially inner end surface of the outer ring 16, so that the cover 42 is positioned in the axial direction. The bottom part (bottom plate) 45 is formed of a resin with excellent radio wave transmissibility such as ABS resin or AS resin.

In the present embodiment, the acceleration measuring device 11, the electric generator 12, the wireless communication device 13, the battery 14 and the charger 15 are assembled to the bearing part 10 to configure the bearing unit 1.

The acceleration measuring device 11 measures translational acceleration acting on the bearing unit 1 (hub 17) and is provided inside the outer end side large-diameter part 30 of the hub body 22. Specifically, the acceleration measuring device 11 is fixed, by a plurality of (four in the illustrated example) bolts 49, 49, to an axially inner side of a cap 48 with connector which is internally fitted and fixed to the positioning cylinder part 38 provided at the axially outer end portion of the hub body 22. In the illustrated example, four cylindrical attachment cylinder parts 50, 50 are provided on a radially outer side portion of an axially inner side surface of the cap 48 with connector so as to protrude axially inward. The bolts 49, 49 are screwed and tightened to the attachment cylinder parts 50, 50. Incidentally, the acceleration measuring device 11 may be supported and fixed to the cap 48 with connector by other fixing means such as bonding.

In the present embodiment, the acceleration measuring device 11 includes a substrate 51 having a circular plate shape, and three (first to third) acceleration sensors 52, 53 and 54. The acceleration sensors 52, 53 and 54 are fixed to a flat surface which is an axially inner side surface of the substrate 51 and are arranged on the same virtual plane orthogonal to a rotation center axis of the hub body 22. In the present embodiment, each of the acceleration sensors 52, 53 and 54 uses a uniaxial acceleration sensor capable of detecting acceleration only in one direction.

Among such three acceleration sensors 52, 53, and 54, the first acceleration sensor 52 and the second acceleration sensor 53 are arranged as follows.

Figure 6:
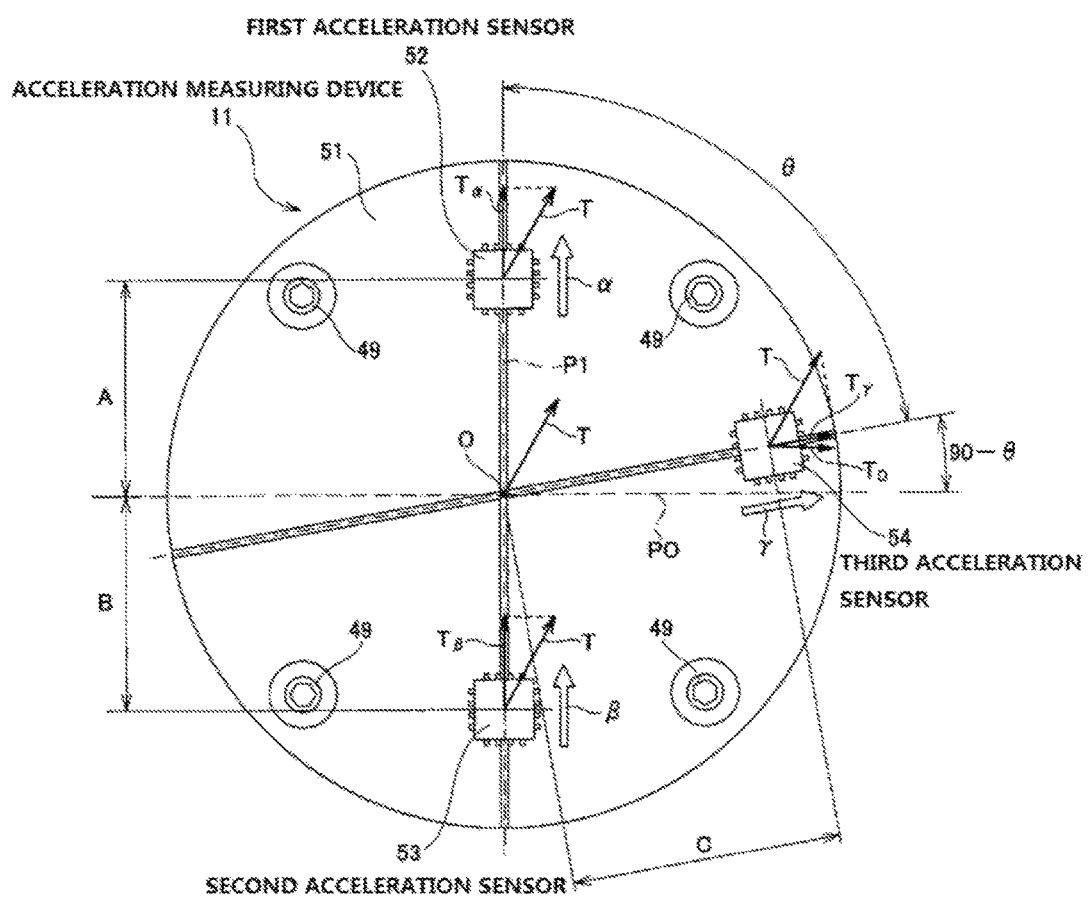
FIG. 6 is a front view of an acceleration measuring device taken out from the vehicle wheel supporting structure.

That is, as shown in FIG. 6, the first acceleration sensor 52 and the second acceleration sensor 53 are arranged on a first virtual line P1 passing through a rotation center O of the hub body 22 and at a position in which a distance (A) from the rotation center O to the first acceleration sensor 52 and a distance (B) from the rotation center O to the second acceleration sensor 53 are equal to each other (A=B). A detection direction (an arrow α in the drawing) of the first acceleration sensor 52 and a detection direction (an arrow β in the drawing) of the second acceleration sensor 53 are directed in the radial direction (radiation direction) of the hub body 22, and are opposite to each other in the radial direction. In the illustrated example, the detection direction (arrow α) of the first acceleration sensor 52 is directed radially outward and the detection direction (arrow β) of the second acceleration sensor 53 is directed radially inward. In other words, the detection direction (arrow α) of the first acceleration sensor 52 and the detection direction (arrow β) of the second acceleration sensor 53 are directed on the first virtual line P1 and are directed in the same direction with respect to the first virtual line P1.

The third acceleration sensor 54 among the acceleration sensors 52, 53, and 54 is arranged at a position in which a phase is shifted from the first acceleration sensor 52 by an angle θ in a circumferential direction (a clockwise direction in the illustrated example) and at a position separated from the rotation center O by a distance (C). In the illustrated example, the distance (C) from the rotation center O to the third acceleration sensor 54 is different from the distances (C≠A=B) from the rotation center O to the first and second acceleration sensors 52, 53, but these distances may be equal to each other (C=A=B). Further, in the present embodiment, a detection direction (an arrow γ in the drawing) of the third acceleration sensor 54 is directed in the radial direction (radially outer side) of the hub body 22. Therefore, the detection direction of the third acceleration sensor 54 is set to be non-parallel to the detection direction of the first acceleration sensor 52 and the detection direction of the second acceleration sensor 53 (restricted to the linearly independent direction).

The electric generator 12 is a magnet type alternating current generator which generates an alternating current of three phases and generates electric power to be supplied to the acceleration sensors 52, 53, and 54, and a sensor (not shown) provided on a vehicle wheel side. The electric generator 12 includes a stator 55 and a rotor 56 concentrically arranged with each other. Incidentally, when implementing the present invention, it is also possible to use an alternating current generator which generates a single phase alternating current.

The stator 55 includes a support ring 57 formed in a cylindrical shape by a magnetic metal plate, and permanent magnets 58, 58 supported and fixed at equal intervals at a plurality of positions in the circumferential direction of an inner peripheral surface of the support ring 57. The permanent magnets 58, 58 are formed in a block shape and magnetized in the radial direction, and magnetized in different directions between the circumferentially adjacent permanent magnets 58, 58. Therefore, S poles and N poles are alternately arranged at equal intervals on an inner side of the support ring 57. Further, the support ring 57 is internally fitted and fixed to an inner peripheral surface of an axially intermediate portion of the support cylinder part 44 configuring the cover 42. Further, among an inner peripheral surface of the support cylinder part 44, a substantially C-shaped retaining ring 59 is locked with an axially outer side portion than a portion in which the support ring 57 is internally fitted, so as to prevent the support ring 57 from displacing axially outward.

On the other hand, the rotor 56 includes a stator core 60 formed by laminating a plurality of electromagnetic steel sheets, and coils 77, 77. The coils 77, 77 are wound around a plurality of radially arranged teeth (salient poles) configuring the stator core 61.

In the present embodiment, the stator core 61 configuring the rotor 56 is externally fitted and fixed to an outer peripheral surface of an axially inner end portion of an accommodating cylinder part 61 having a hollow cylindrical shape. The accommodating cylinder part 61 includes a cylindrical small-diameter cylinder part 62 provided at an axially outer half portion and a substantially conical cylindrical large-diameter cylinder part 63 provided at an axially outer half portion, and the stator core 60 is externally fitted to an outer peripheral surface of an axially inner end portion of the large-diameter cylinder part 63. In the present embodiment, the large-diameter cylinder part 63 configuring the accommodating cylinder part 61 is arranged inside of the inner end side large-diameter part 32 of the through hole 29 provided in the hub body 22, and the small-diameter cylinder part 62 is arranged inside of the outer end side large-diameter part 30 and the small-diameter part 31. Further, a substantially C-shaped locking ring 64 is locked with an outer peripheral surface of the small-diameter cylinder part 62. The inward flange part 33 is sandwiched from axial both sides by the locking ring 64 and an axially outer end surface of the large-diameter cylinder part 63, so that the accommodating cylinder part 61 is prevented from being displaced in the axial direction with respect to the hub body 22.

In the present embodiment, the stator 55 is coupled and fixed to the inner peripheral surface of the support cylinder part 44 configuring the cover 42, and the rotor 56 is coupled and fixed to the hub body 22 via the accommodating cylinder part 61. In this case, the stator 55 and the rotor 56 are arranged concentrically, an outer peripheral surface of the rotor 56 faces inner peripheral surfaces of the permanent magnets 58, 58 configuring the stator 55 in the radial direction via a minute clearance. By adopting such a configuration, when the rotor 56 rotates together with the hub 17, electromotive force is generated by an electromagnetic induction action of the coils 77, 77. That is, the electric generator 12 generates electric power by rotating the hub 17 together with the vehicle wheel.

The wireless communication device 13 performs wireless communication (both transmission and reception are possible in the present example) with a calculator 65 which is an electronic equipment provided on a vehicle body 7 side, and includes a wireless communication circuit (substrate) 66 and an antenna. The wireless communication device 13 is fixed to an inner side of the large-diameter cylinder part 63 configuring the accommodating cylinder part 61 via a plurality of bolts 67, 67. That is, in the present embodiment, the wireless communication device 13 is arranged radially inward of the electric generator 12, and the antenna configuring the wireless communication device 13 is arranged to close to and facing the bottom part 45 configuring the cover 42 in the axial direction. Accordingly, a wireless signal transmitted and received by the antenna is effectively prevented from being blocked by the cover 42 such that wireless communication can be performed efficiently between the wireless communication device 13 and the calculator 65.

The battery 14 stores the electric power generated by the electric generator 12 and includes a plurality of storage batteries (for example a nickel hydrogen battery) connected in series. The charger 15 supplies the electric power generated by the electric generator 12 to the battery 14 and charges the battery 14 and includes a rectifier circuit configured to convert an AC voltage generated by the electric generator 12 into a DC voltage, a charge/discharge control circuit configured to control charging and discharging according to a remaining amount of the battery 14, and a voltage control circuit configured to output a constant voltage regardless of variations in rotation numbers of the rotor 56. In the present embodiment, the charger 15 is arranged inside of the large-diameter cylinder part 63 configuring the accommodating cylinder part 61, and the battery 14 is inserted into the small-diameter cylindrical part 62 configuring the accommodating cylinder part 61 from the axially inner side while being accommodated in a substantially cylindrical battery case 68.

In the present embodiment, an axially outer end opening portion (outer end side large-diameter part 30) of the through hole 29 formed in the hub body 22 is closed by the cap 48 with connector. The cap 48 with connector is provided with a connector part 69 for connecting one or a plurality of sensors (wiring) arranged on the vehicle wheel at the center portion of the axially outer end surface. The connector part 69 supplies the electric power generated by the electric generator 12 to the sensor, and an output signal of the sensor is transmitted to the wireless communication device 13.

In the present embodiment, according to the above configuration, in the state of the acceleration measuring device 11, the electric generator 12, the wireless communication device 13, the battery 14 and the charger 15 being assembled to the bearing part 10, the constituent members are electrically connected to each other so as to be able to supply electric power and communicate signals.

Incidentally, in the present embodiment, from the viewpoint of suppressing the cost increase at the time of tire replacement, among the sensors for measuring a state quantity of the tire 2, only a tire side sensor for measuring a state quantity which cannot be measured unless the sensor is provided in the tire 2 directly such as a wear sensor, a tire distortion sensor, or a temperature sensor is directly provided on the tire 2. In contrast, a wheel side sensor for measuring a state quantity which can be measured without providing the sensor in the tire 2 such as an air pressure sensor, or a wheel distortion sensor is provided on the wheel 3.

In the bearing unit 1 of the present embodiment having the above configuration, when the vehicle wheel (tire 2 and wheel 3) rotates as the vehicle travels, the hub 17 which is the rotation side bearing ring member of the bearing part 10 rotates. Then, the rotor 56 supported and fixed to an axially inner end portion of the hub 17 rotates relative to the stator 55 supported and fixed to the outer ring 16 which is the stationary side bearing ring member. Thereby, the electric generator 12 including the stator 55 and the rotor 56 generates the electric power. The AC voltage generated by the electric generator 12 is transmitted to the charger 15 through a cable or the like (not shown). After the AC voltage is converted into the DC voltage by the charger 15, the DC voltage is supplied to the battery 14. The electric power stored in the battery 14 is supplied to the acceleration sensors 52, 53 and 54 through the substrate 51 configuring the acceleration measuring device 11 and is supplied to the tire side sensor provided on the tire 2 and the wheel side sensor provided on the wheel 3 via the connector part 69. The acceleration sensors 52, 53 and 54 measure the acceleration, and the tire side and wheel side sensors detect the state quantity (for example, tire air pressure, distortion, temperature, or the like) of the tire 2 and the wheel 3. The electric power stored in the battery 14 is also supplied to the wireless communication device 13.

Subsequently, the output signals of the acceleration sensors 52, 53 and 54 and the output signals of the tire side and wheel side sensors are sent to the wireless communication device 13. The output signals of these sensors are wirelessly transmitted by the antenna of the wireless communication device 13 to the calculator 65 arranged at the vehicle body 7 side through the bottom part 45 configuring the cover 42. The calculator 65 (described later) calculates the translational acceleration acting on the bearing unit 1 based on the output signals of the acceleration sensors 52, 53 and 54, calculates a load (ground contact load) acting on the tire 2, and is used for an active safety technology.

In the bearing unit 1 according to the present embodiment, a signal relating to traveling speed of the vehicle is received from the calculator 65 by the wireless communication device 13 (antenna). Only when the traveling speed is equal to or more than a predetermined value, that is, when it can be determined that the vehicle is in a traveling state, the electric power is supplied to the acceleration sensors 52, 53 and 54, and the tire side and wheel side sensors, whereas when the traveling speed is less than the predetermined value, that is, when it can be determined that the vehicle is substantially stopped, the supply of electric power is stopped. Accordingly, waste power consumption of the battery 14 can be prevented by performing such electric power supply control.

Then, a calculation method which is used for obtaining the translational acceleration acting on the bearing unit 1 by the output signals of the first to third acceleration sensors 52, 53 and 54 configuring the acceleration measuring device 11 will be described.

At first, in the present embodiment, as described above, the first acceleration sensor 52 and the second acceleration sensor 53 are arranged on the first virtual line P I passing through the rotation center O of the hub body 22 and at a position in which the distance (A) from the rotation center O to the first acceleration sensor 52 and the distance (B) from the rotation center O to the second acceleration sensor 53 are equal to each other (A=B). Further, the detection direction (the arrow α in FIG. 6) of the first acceleration sensor 52 and the detection direction (the arrow β in FIG. 6) of the second acceleration sensor 53 are directed in the radial direction (radiation direction) of the hub body 22 and are opposite to each other in the radial direction.

The magnitudes of centrifugal acceleration and the magnitudes of the translational acceleration (the magnitude of the translational acceleration in the output signal) acting on the first acceleration sensor 52 and the second acceleration sensor 53 arranged in this manner are respectively equal to each other. In other words, the first and second acceleration sensors 52, 52 are provided at equal distances (A=B) from the rotation center O, and thus the magnitudes of the centrifugal acceleration acting on the first acceleration sensor 52 and the second acceleration sensor 53 are equal. Since the magnitude of the translational acceleration acting on the bearing unit 1 is equal for any portion of the bearing unit 1, the magnitudes of the translational acceleration acting on the first acceleration sensor 52 and the second acceleration sensor 53 are equal. For example, when it is assumed that the translational acceleration indicated by a vector T is acting on the bearing unit 1 in a rotating coordinate system as shown in FIG. 6, the translational acceleration of the vector T similarly acts on the first acceleration sensor 52 and the second acceleration sensor 53. Accordingly, a value obtained by adding a value of a component in the detection direction (the arrow α direction) of the translational acceleration (T) acting on the first acceleration sensor 52 to the centrifugal acceleration {Ca (positive value)} acting on the first acceleration sensor 52 is output from the first acceleration sensor 52. On the other hand, a value obtained by adding the value of the component in the detection direction (the arrow β direction) of the translational acceleration (T) acting on the first acceleration sensor 52 to the centrifugal acceleration {Ca (negative value)} acting on the second acceleration sensor 53 is output from the second acceleration sensor 53.

A value of the output signal of the second acceleration sensor 53 is subtracted from that of the output signal of the first acceleration sensor 52 (or a value of the output signal of the first acceleration sensor 52 is subtracted from that of the output signal of the second acceleration sensor 53), so that a value twice as large as the centrifugal acceleration (|2Ca|) acting equally on the first and second acceleration sensors 52, 53 is obtained and ultimately the magnitude of the centrifugal acceleration (|Ca|) can be obtained. The magnitudes ($T_\alpha$, $T_\beta$) of components in the detection directions (arrow α and β directions) of the translational acceleration (T) acting on the first and second acceleration sensors 52, 53 can be then calculated by subtracting the centrifugal acceleration from the output signal of the first acceleration sensor 52 (or second acceleration sensor 53).

Further, in the present embodiment, the third acceleration sensor 54 is arranged at a position in which the phase is shifted from the first acceleration sensor 52 by an angle θ in the circumferential direction (a clockwise direction in the illustrated example) and at a position separated from the rotation center O by the distance (C). Further, the detection direction (arrow γ in the figure) of the third acceleration sensor 54 is directed in the radial direction (radially outer side) of the hub body 22.

Thereby, the magnitude of the centrifugal acceleration acting on the third acceleration sensor 54 arranged in this manner can be obtained using the magnitudes (Ca) of the centrifugal acceleration acting on the first and second acceleration sensors 52, 53 obtained above, and a ratio between the distance (C) from the rotation center O to the third acceleration sensor 54 and the distance (A=B) from the rotation center O to the first or second acceleration sensors 52, 53. That is, the magnitude of the centrifugal acceleration acting on the third acceleration sensor 54 can be calculated by the expression Ca×(C/A). Accordingly, a value of the centrifugal acceleration acting on the third acceleration sensor 54 is subtracted from the output signal of the third acceleration sensor 54, so that the magnitude ($T_\gamma$) of the component in the detection direction (an arrow γ direction) of the translational acceleration (T) acting on the third acceleration sensor 54 is obtained. Further, since the third acceleration sensor 54 is provided at a position in which the phase is shifted from the first acceleration sensor 52 by the angle θ in the circumferential direction, a phase shifting angle from a virtual line PO orthogonal to the first virtual line P1 passing through the first acceleration sensor 52 and the second acceleration sensor 53 to the third acceleration sensor 54 is expressed by (90°-θ). Therefore, by using the magnitude ($T_\gamma$) of the component in the detection direction of the translational acceleration calculated from the output signal of the third acceleration sensor 54 and the cosine theorem, the magnitude ($T_o$) of the component in the virtual line PO direction of the translational acceleration can be obtained. By using the two components $\{T_\alpha(T_\beta), T_o\}$ mutually orthogonal to each other in the translational acceleration (T) thus obtained, the magnitude $\{|T|=(T\alpha^2+To^2)^{1/2}\}$ of the translational acceleration (T) can be obtained.

Incidentally, in the present embodiment, the third acceleration sensor 54 is provided at a position in which the phase is shifted from the first acceleration sensor 52 by the angle θ in the circumferential direction, and the angle θ can be arbitrarily set. For example, when the angle θ is set as 90°, the detection direction of the third acceleration sensor 54 is orthogonal to the detection directions of the first and second acceleration sensors 52, 53, and therefore (the calculation by the cosine theorem is omitted) the magnitude ($T_\gamma$) of the component in the detection direction (arrow γ direction) of the translational acceleration (T), that is a value obtained by subtracting the value of the centrifugal acceleration from the output signal of the third acceleration sensor 54, is used as it is, so that the translational acceleration (T) can be calculated.

Therefore, this is advantageous in reducing a calculation processing amount.

In the present embodiment, the third acceleration sensor 54 is provided at a position separated from the rotation center O by the distance (C), and the distance (C) can be arbitrarily set. For example, when the distance (C) is made equal to the distances (A, B) from the rotation center O to the first and second acceleration sensors 52, 53, the magnitudes of the centrifugal acceleration acting on the first and second acceleration sensors 52, 53 can be used as it is as the magnitude of the centrifugal acceleration acting on the third acceleration sensor 54. Therefore, this is advantageous in reducing the calculation processing amount.

In any case, according to the bearing unit 1 of the present embodiment, the magnitude of the translational acceleration acting on the bearing unit 1 can be measured. Therefore, by using the value of the translational acceleration, the load acting on the tire 2 can be obtained regardless of the operating state of the brake, while suppressing the cost increase.

In the present embodiment, the electric power generated by the electric generator 12 provided in the bearing unit 1 and stored in the battery 14 can be supplied to the acceleration sensors 52, 53 and 54, and the tire side and wheel side sensors. Further, the output signals of the acceleration sensors 52, 53 and 54, and the output signals of the tire side and wheel side sensors can be wirelessly transmitted to the calculator 65 provided at the vehicle body 7 side from the wireless communication device 13 provided in the bearing unit 1. Therefore, when the bearing unit 1 is mounted to the knuckle 6, handling workability of the harness is not necessarily performed, and assembly workability can be improved accordingly.

Even when replacing the tire 2, the acceleration measuring device 11, the electric generator 12, the wireless communication device 13, the battery 14, and the charger 15 provided in the bearing unit 1 can be continuously used as they are. Therefore, as compared with a case where the electric generator or the like is provided in the tire, the cost at the time of the tire replacement can be suppressed low.

Further, in the present embodiment, even when tire rotation (change in tire position) is performed to prevent uneven wear, since there is no change in an attachment position of the bearing unit 1 itself having a wireless communication function, a problem in determining which tire a signal is received by the calculator 65 at the vehicle body 7 side can be prevented.

[Second Embodiment]

Figure 7:
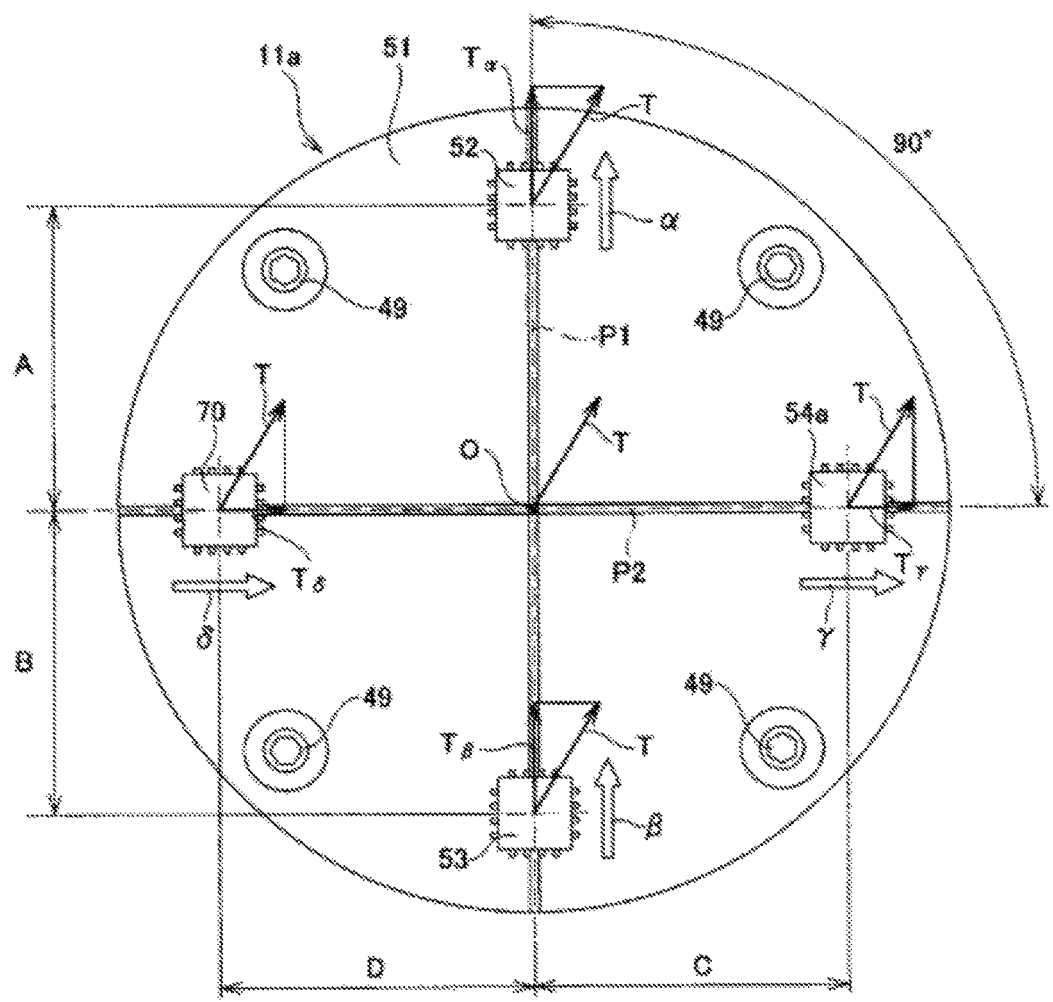
FIG. 7 is a view showing a second embodiment of the present invention and corresponding to FIG. 6.

A second embodiment of the present invention will be described with reference to FIG. 7. In the present embodiment, by devising a configuration of an acceleration measuring device 11a, a calculation processing amount for calculating the translational acceleration acting on the bearing unit 1 can be reduced.

In the present embodiment, the acceleration measuring device 11a includes the substrate 51 and four (first to fourth) acceleration sensors 52, 53, 54a and 70. Similarly to the first embodiment, the first and second acceleration sensors 52, 53 are arranged on the first virtual line P1 passing through the rotation center O of the hub body 22 (refer to FIG. 4) and at the position in which the distance (A) from the rotation center O to the first acceleration sensor 52 and the distance (B) from the rotation center O to the second acceleration sensor 53 are equal to each other (A=B). Further, the detection direction (arrow α in FIG. 7) of the first acceleration sensor 52 and the detection direction (arrow β in FIG. 7) of the second acceleration sensor 53 are directed in the radial direction of the hub body 22 and are opposite to each other in the radial direction.

The third acceleration sensor 54a and the fourth acceleration sensor 70 are arranged on a second virtual line (P2) which passes through the rotation center O and is orthogonal to the first virtual line (P1). Herein, not only a distance (C) from the rotation center O to the third acceleration sensor 54a and a distance (D) from the rotation center O to the fourth acceleration sensor 70 are equal to each other (C=D), but also the distances (C, D) from the rotation center O to the third and fourth acceleration sensors 54a, 70 and the distances (A, B) from the rotation center O to the first and second acceleration sensors 52, 53 are equal to each other (C=D=A=B). Further, a detection direction (the arrow γ in FIG. 7) of the third acceleration sensor 54a and a detection direction (an arrow δ in FIG. 7) of the fourth acceleration sensor 70 are directed in the radial direction of the hub body 22 and are opposite to each other in the radial direction. In the illustrated example, the detection direction (arrow γ) of the third acceleration sensor 54a is directed radially outward and the detection direction (arrow δ) of the fourth acceleration sensor 70 is directed radially inward.

In the present embodiment having the above configuration, it is possible to obtain the translational acceleration acting on the bearing unit 1 as follows.

At first, according to the same method as that in the first embodiment, the magnitudes of the centrifugal acceleration (Ca) and the magnitudes ($T_\alpha$, $T_\beta$) of the components in the detection directions (arrow α and β directions) of the translational acceleration (T), acting on the first and second acceleration sensors 52, 53, are calculated. In the present embodiment, by performing the same processing as that performed for the first and second acceleration sensors 52, 53 on output signals of the third and fourth acceleration sensors 54a, 70, magnitudes ($T_\gamma$, $T_\delta$) of components in the detection directions (arrow γ and δ directions) of the translational acceleration (T) acting on the third and fourth acceleration sensors 54a, 70 are obtained. Since the components {$T_\alpha$ ($T_\beta$), $T_\gamma$ ($T_\delta$)} in two directions of the translational acceleration (T) obtained above are two components in mutually orthogonal directions, it is possible to obtain the magnitude of the translational acceleration (T) by using these components as they are.

In the present embodiment having the above configuration, as compared with the first embodiment, the calculation processing amount for calculating the translational acceleration can be reduced. Therefore, it is possible to calculate the magnitude of the translational acceleration with only an analog circuit without using a microcomputer.

Other configurations and operational effects of the present embodiment are the same as those in the first embodiment.

[Third Embodiment]

Figure 8:
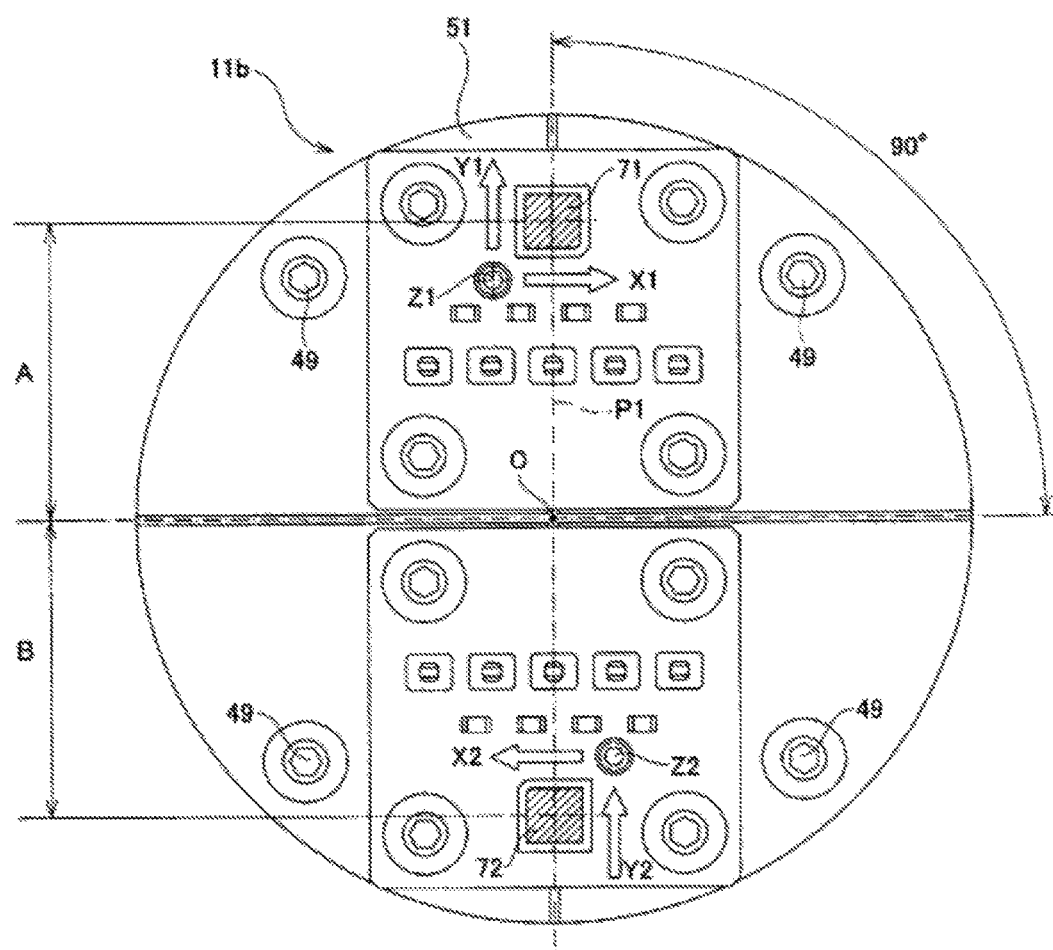
FIG. 8 is a view showing a third embodiment of the present invention and corresponding to FIG. 6.
Figure 9:
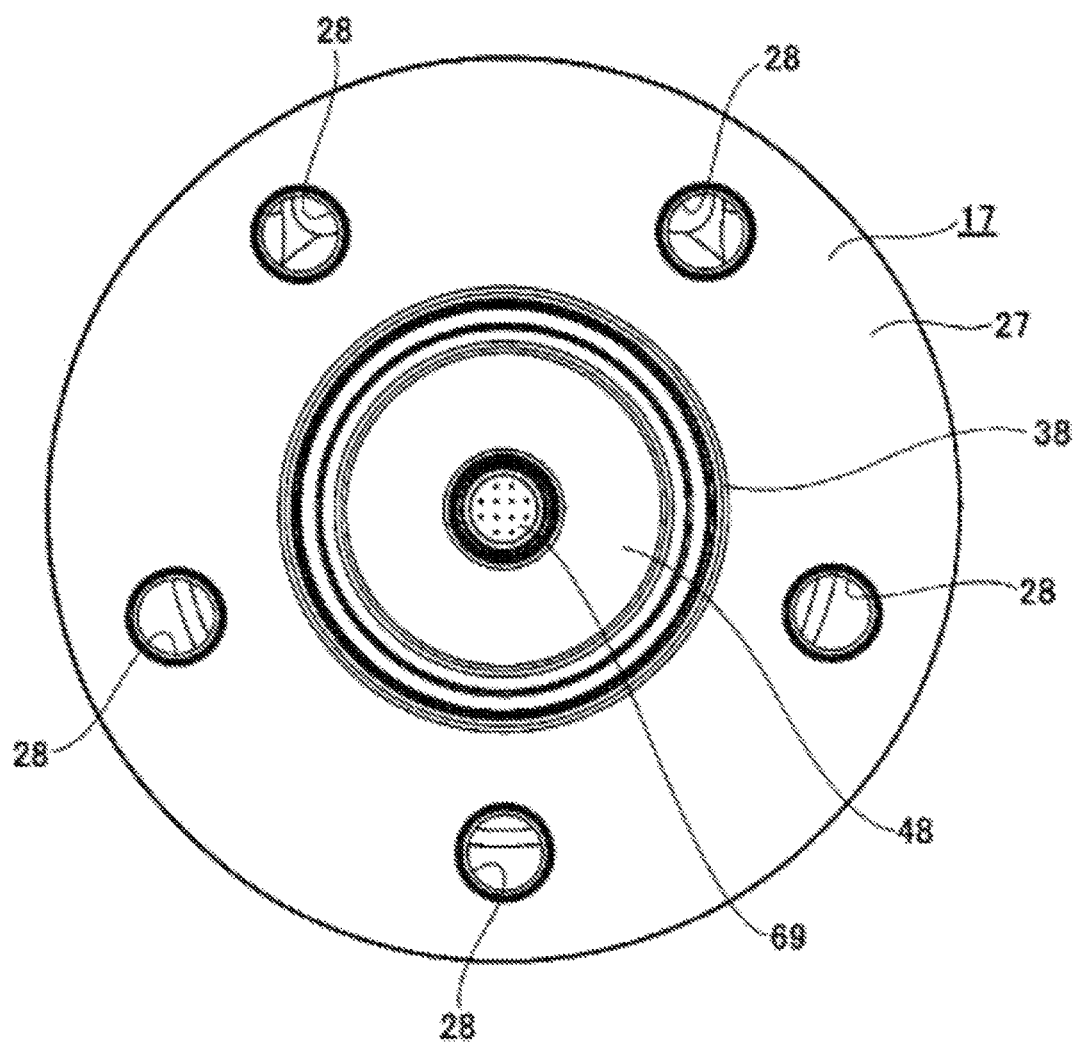
FIG. 9 is a view showing a fourth embodiment of the present invention and corresponding to FIG. 3.
Figure 10:
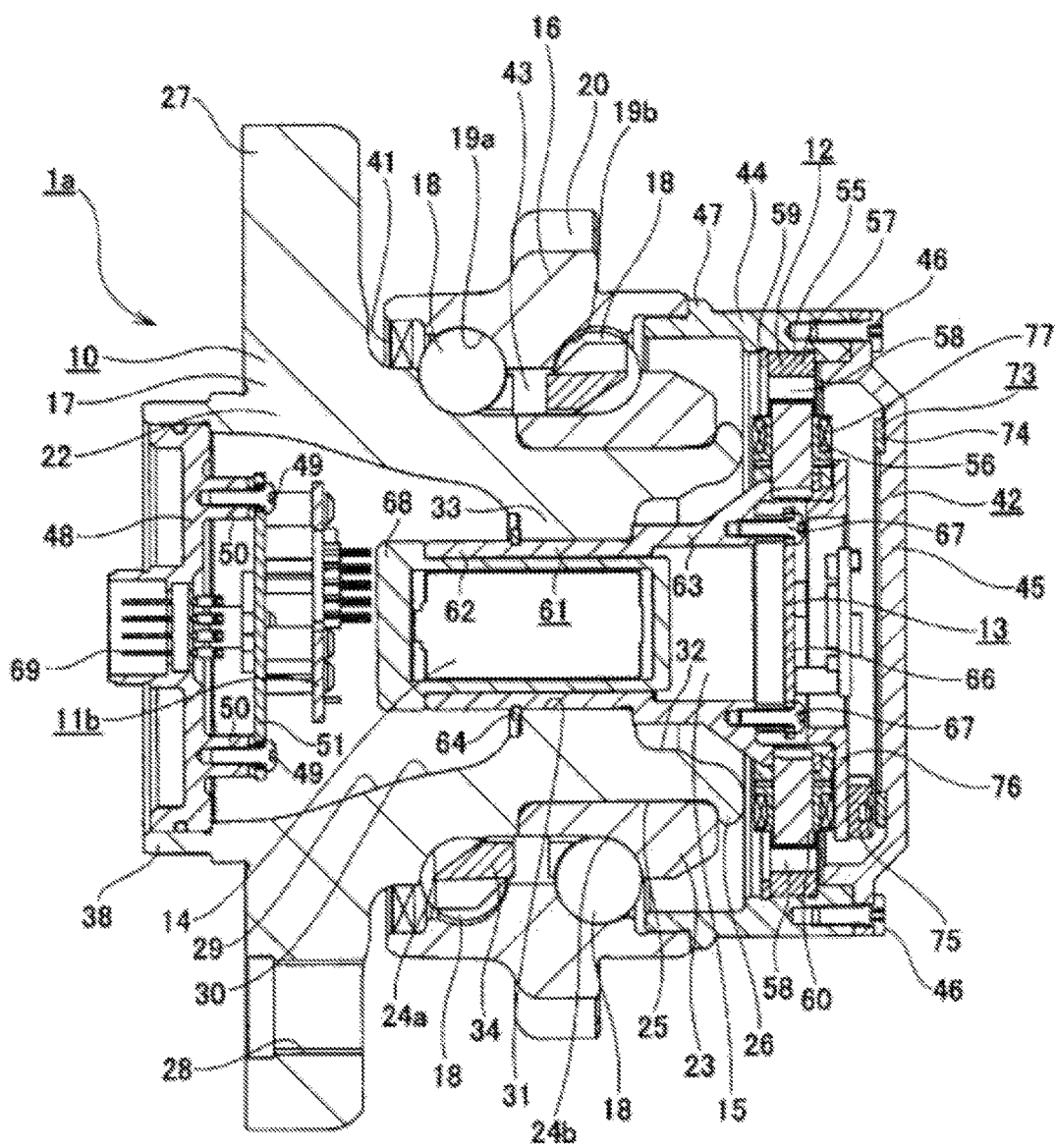
FIG. 10 is a view showing the fourth embodiment of the present invention and corresponding to FIG. 4.
Figure 11:
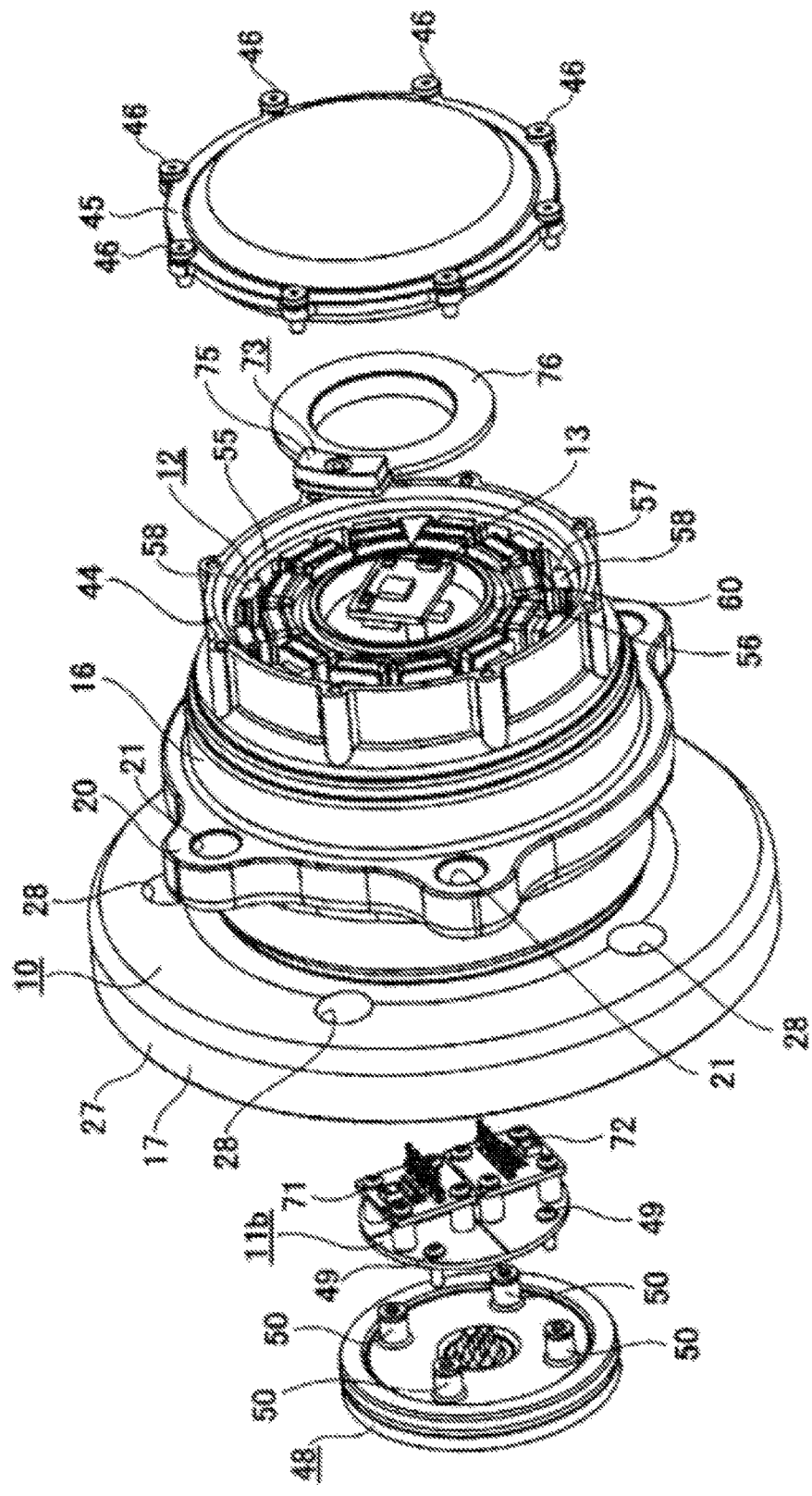
FIG. 11 is an exploded perspective view showing the fourth embodiment of the present invention.
Figure 12:
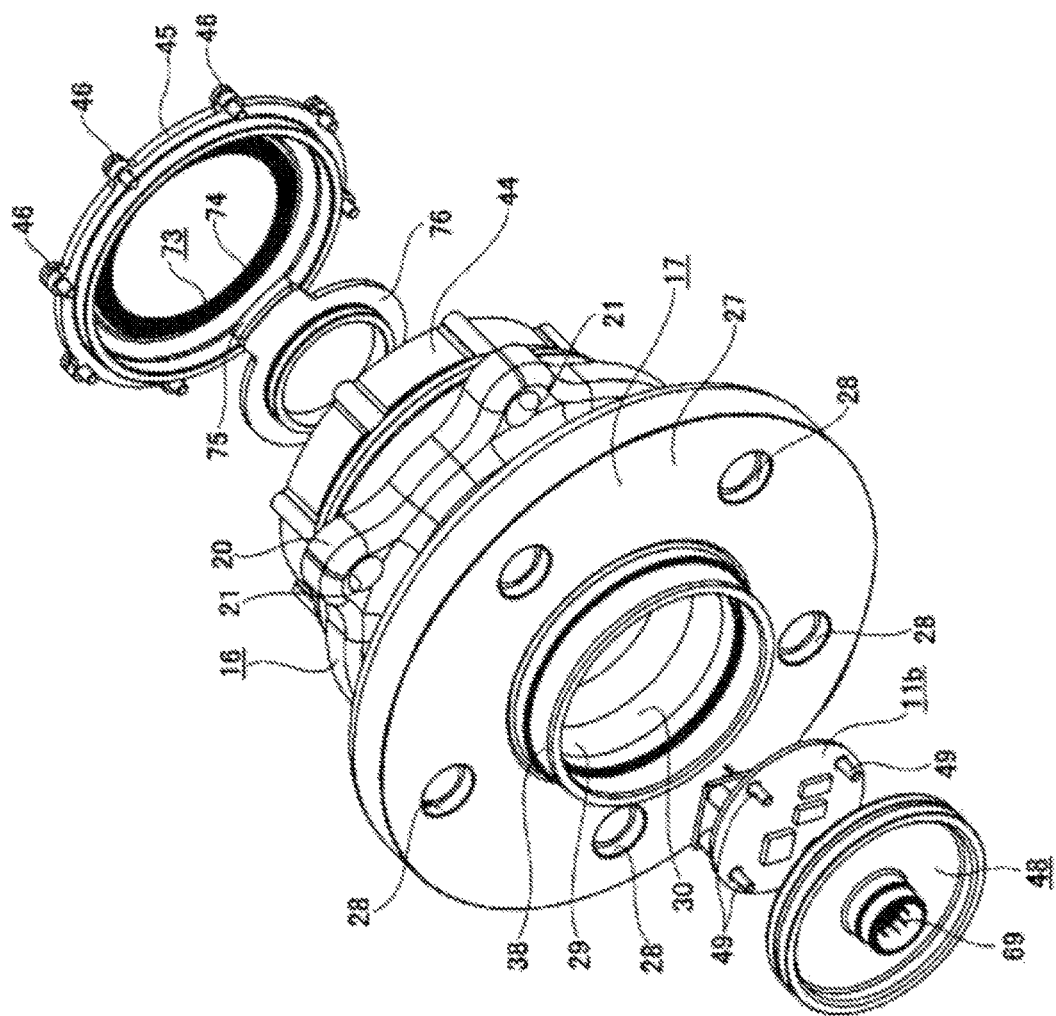
FIG. 12 is an exploded perspective view showing the fourth embodiment of the present invention as viewed from another angle.

A third embodiment of the present invention will be described with reference to FIG. 8. In the present embodiment, a triaxial acceleration sensor is used as an acceleration sensor configuring an acceleration measuring device 11b.

The acceleration measuring device 11b used in the present embodiment includes a substrate 51 having a circular plate shape, and two triaxial acceleration sensors 71, 72. Each of the triaxial acceleration sensors 71, 72 is configured by combining three uniaxial acceleration sensors such that the detection directions thereof are orthogonal to each other, and three output signals are obtained for each of the triaxial acceleration sensors 71, 72. Accordingly, in the present embodiment, although it appears that only two acceleration sensors are used, it is substantially equivalent to use six uniaxial acceleration sensors in total. However, as compared with the case of using six uniaxial acceleration sensors in total, an attaching work to the substrate is reduced, and space can be saved. Incidentally, although such an effect can be obtained, as a modification, a total of six uniaxial acceleration sensors may be used by arranging attachment positions of the sensors at two positions.

In the present embodiment, the two triaxial acceleration sensors 71, 72 are arranged in the same position relationship as that between the first acceleration sensor and the second acceleration sensor in the first embodiment. That is, a first triaxial acceleration sensor 71 and a second triaxial acceleration sensor 72 are arranged on the first virtual line P1 passing through the rotation center O (refer to FIG. 4) of the hub body 22 and at a position in which a distance (A) from the rotation center O to the triaxial acceleration sensor 71 and a distance (B) from the rotation center O to the triaxial acceleration sensor 72 are equal to each other (A=B).

In the present embodiment, a first detection direction (an arrow Y1 direction in FIG. 8) among three detection directions of the first triaxial acceleration sensor 71 and a first detection direction (an arrow Y2 direction in FIG. 8) among three detection directions of the second triaxial acceleration sensor 72 are directed in the radial direction of the hub body 22 and are opposite to each other in the radial direction.

A second detection direction (an arrow X1 direction in FIG. 8) of the first triaxial acceleration sensor 71 and a second detection direction (an arrow X2 direction in FIG. 8) of the second triaxial acceleration sensor 72 are located on the same virtual plane (a virtual plane orthogonal to the center axis of the hub body 22) on which the first triaxial acceleration sensor 71 and the second triaxial acceleration sensor 72 are provided and are arranged in directions which are orthogonal to the first detection direction and opposite to each other. Further, a third detection direction (an arrow Z1 direction in FIG. 8) of the first triaxial acceleration sensor 71 and a third detection direction (an arrow Z2 direction in FIG. 8) of the second triaxial acceleration sensor 72 are arranged in directions (the axial direction of the hub body 22) which are orthogonal to the same virtual plane and opposite to each other.

In the present embodiment having the above configuration, similarly to the first embodiment, according to an output signal based on the first detection direction of an output signal of the first triaxial acceleration sensor 71 and an output signal based on the first detection direction of an output signal of the second triaxial acceleration sensor 72, the magnitude of the centrifugal acceleration (Ca) and the magnitudes of the components in the first detection directions (arrow Y1 and Y2 directions) of the translational acceleration (T), acting on the first and second triaxial acceleration sensors 71, 72, can be calculated. Further, in the present embodiment, according to an output signal based on the second detection direction of the output signal of the first triaxial acceleration sensor 71 and an output signal based on the second detection direction of the output signal of the second triaxial acceleration sensor 72, the magnitudes of the components in the second detection directions (arrow X1 and X2 directions) of the translational acceleration (T) acting on the first and second triaxial acceleration sensors 71, 72 can be calculated. Since the components in two directions of the translational acceleration (T) obtained above are two components in mutually orthogonal directions, it is possible to obtain the magnitude of the translational acceleration (T) by using these components as they are.

Other configurations and operational effects of the present embodiment are the same as those in the first embodiment.

[Fourth Embodiment]

A fourth embodiment of the present invention will be described with reference to FIGS. 9 to 12. In the present embodiment, a rotation angle detection device (rotary encode) 73 is provided in a bearing unit 1a, thereby obtaining a direction of the translational acceleration acting on the bearing unit 1a. Other configurations and operational effects of the present embodiment are the same as those in the first and third embodiments.

In the present embodiment, a reflective optical system absolute encoder is used as the rotation angle detection device 73. The rotation angle detection device 73 is formed in a circular ring shape and includes an encoder (target) 74 having a pattern (for example, a slit) formed on an axially outer side surface in a circumferential direction, and a reflection type light receiving sensor 75 which faces the axially outer side surface of the encoder 74 in the axial direction via a minute clearance. The encoder 74 is fixed to an axially outer side surface of the bottom part 45 configuring the cover 42 fixed to the axially inner end portion of the outer ring 16. On the other hand, the reflection type light receiving sensor 75 is fixed to the axially inner end portion of the accommodating cylinder part 61 fixed to the inner side of the hub body 22. Specifically, by using an attachment bracket 76 having a substantially L-shaped cross section internally fitted and fixed to the large-diameter cylinder part 63 configuring the accommodating cylinder part 61, the reflection type light receiving sensor 75 is supported and fixed to the encoder 74 at a state of facing each other in the axial direction.

In the present embodiment, the electric power generated by the electric generator 12 is also supplied to the reflection type light receiving sensor 75. Incidentally, since the specific configuration and an operating principle of the rotation angle detection device are not a concept of the present invention, and for example, described in detail in Patent Documents 2 to 4, or the like, the detailed description thereof is omitted here.

In the present embodiment having the above configuration, based on the output signal of the reflection type light receiving sensor 75, it is possible to measure how much degree (how much radian) the hub body 22 (hub 17) to which the reflection type light receiving sensor 75 is supported and fixed is rotated from an origin position (initial setting value) of the outer ring 16 which is a stationary ring. Therefore, if a rotation angle thus obtained and the direction (the direction viewed from a rotation system) and the magnitude of the translational acceleration acting on the bearing unit 1a calculated from the acceleration measuring device 11b are processed in synchronization, it is possible to specify to what extent (magnitude) the translational acceleration acts in which direction when viewed from a stationary system.

Other configurations and operational effects of the present embodiment are the same as those in the first and third embodiments.

[Fifth Embodiment]

Figure 13:
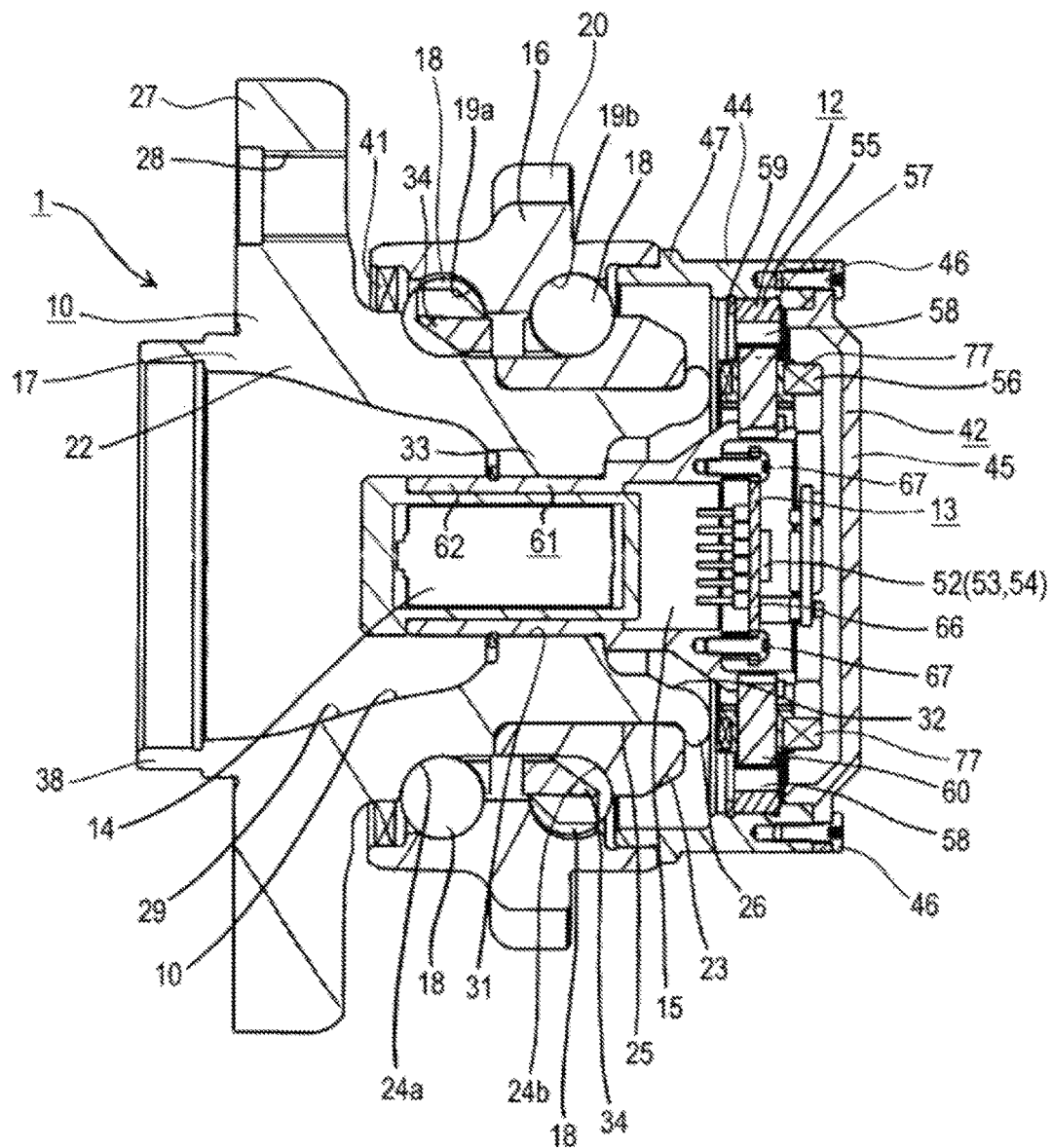
FIG. 13 is a view showing a fifth embodiment of the present invention and corresponding to FIG. 4.

A fifth embodiment of the present invention will be described with reference to FIG. 13. In the present embodiment, an attachment position of the acceleration sensor 52 (53, 54) is changed. Other configurations and operational effects of the present embodiment are the same as those in the first embodiment.

In the first embodiment, the acceleration sensors are attached on an axially inner side surface of the cap 48 with connector (refer to FIG. 4 or the like) provided to close the axially outer end opening portion of the through hole 29 formed in the hub body 22, but in the present embodiment, the cap 48 with connector is omitted, and the acceleration sensor 52 (53, 54) is attached on the substrate configuring the wireless communication device 13 or the substrate configuring the charger 15.

As described above, in the present embodiment, since the cap 48 with connector is omitted, there is not provided with a function of supplying the electric power generated by the electric generator 12 to the tire side and wheel side sensors, and a function of communicating signals between the tire side and wheel side sensors and the wireless communication device 13. In the present embodiment, since the acceleration sensor 52 (53, 54) is attached (implemented) to the substrate configuring the wireless communication device 13 or the substrate configuring the charger 15, the number of parts can be reduced, and an acceleration detection function can be realized with a simple structure.

Other configurations and operational effects of the present embodiment are the same as those in the first embodiment.

[Sixth Embodiment]

Figure 14:
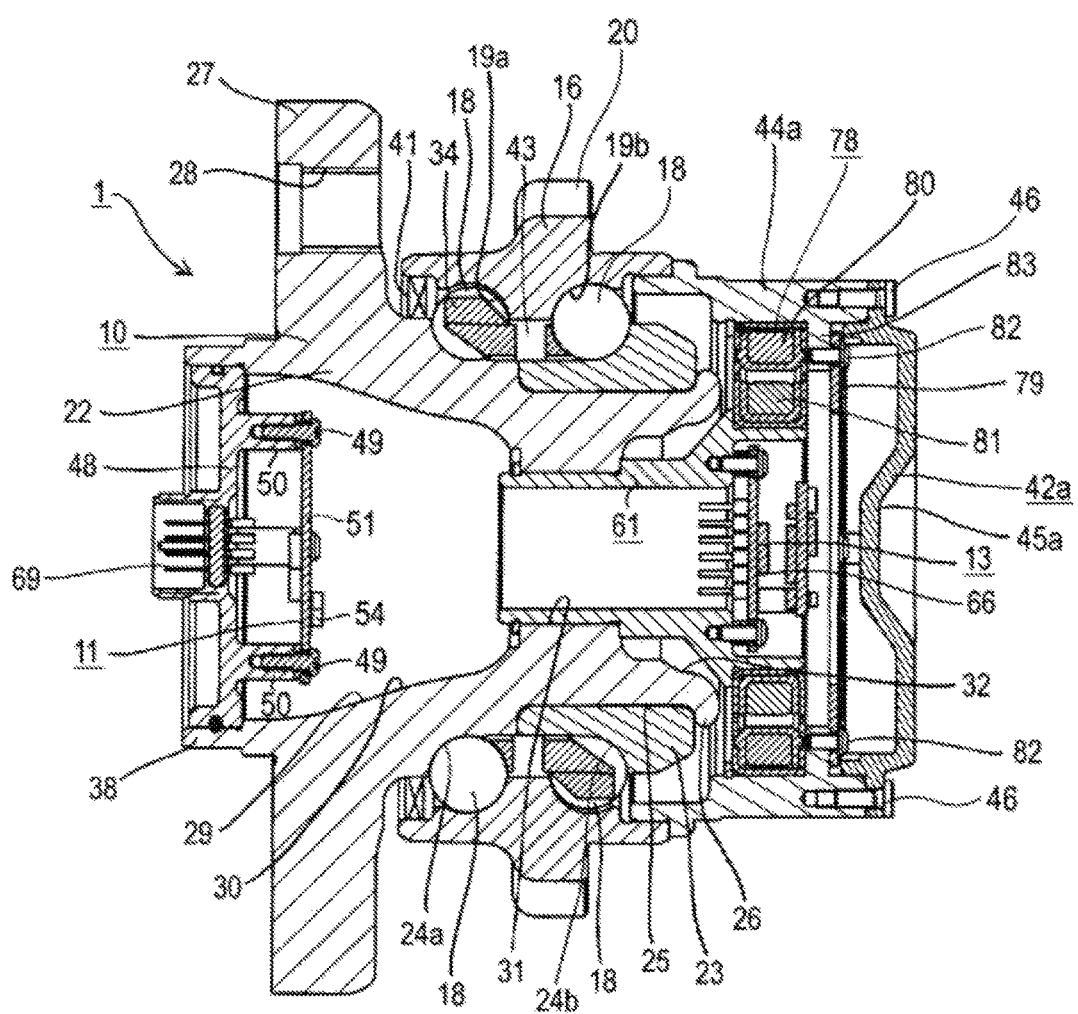
FIG. 14 is a view showing a sixth embodiment of the present invention and corresponding to FIG. 4.
Figure 15:
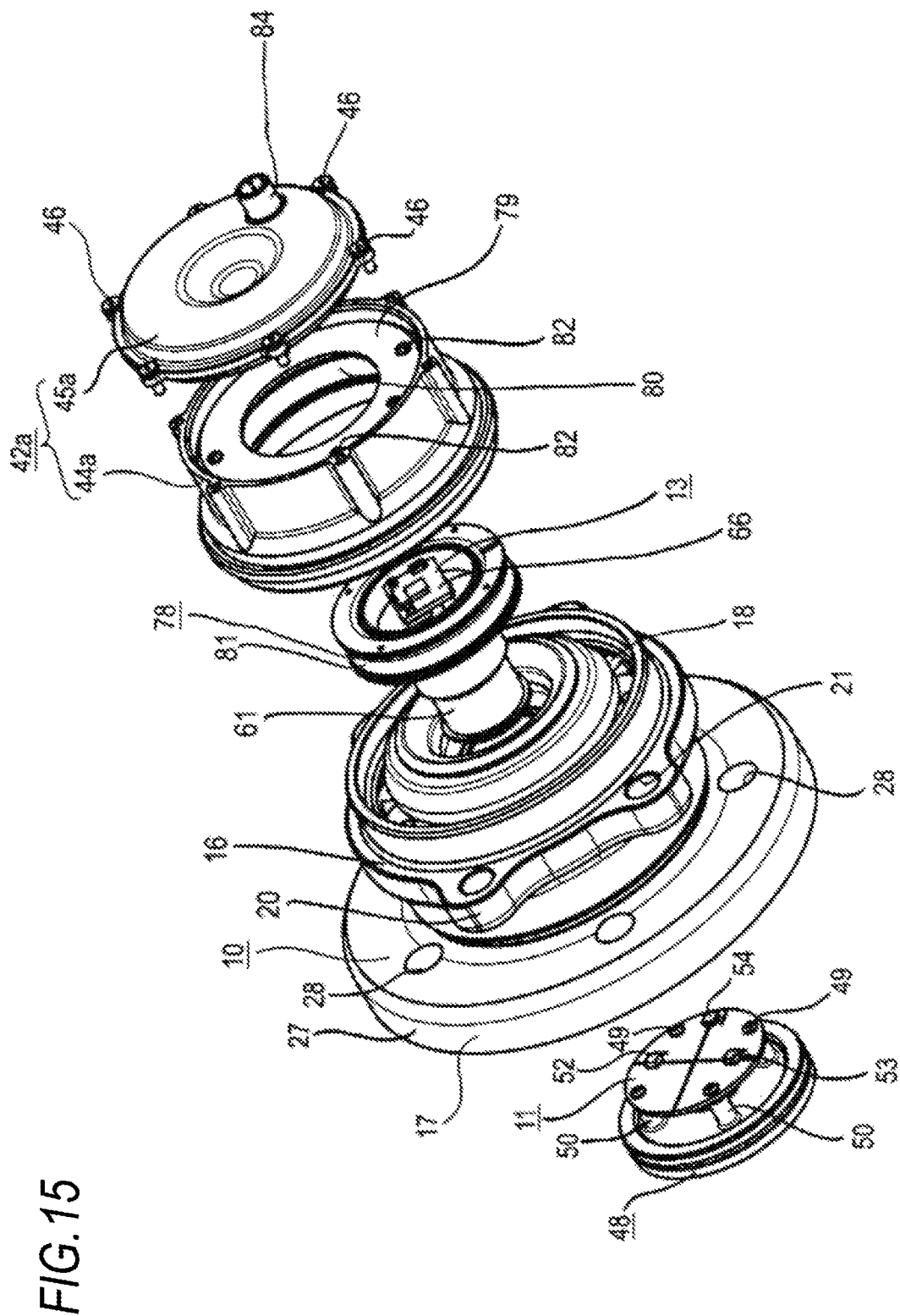
FIG. 15 is a view showing a sixth embodiment of the present invention and corresponding to FIG. 5.

A sixth embodiment of the present invention will be described with reference to FIGS. 14 and 15. In the present embodiment, the electric power is supplied to the acceleration sensors 52, 53 and 54 and the tire side and wheel side sensors using wireless power supply instead of the electric power generated by the electric generator. Other configurations and operational effects of the present embodiment are the same as those in the first embodiment.

In the present embodiment, a wireless power supply device 78 is provided instead of the electric generator 12 (refer to FIG. 4 or the like). The wireless power supply device 78 is an electromagnetic induction type wireless power supply device and includes a substrate 79 for primary coil, a primary coil 80, and a secondary coil 81. The substrate 79 for primary coil is formed in a substantially circular ring shape and is fixed to an inner side of a cover 42*a* which closes the axially inner end opening portion of the outer ring 16 via a plurality of attachment bolts 82, 82. Specifically, the substrate 79 for primary coil is fixed to an axially inner side surface of an inward flange part 83 provided on an inner peripheral surface of a support cylinder part 44*a* configuring the cover 42*a* by using the attachment bolts 82, 82. A connector part 84 is provided on a bottom part 45*a* configuring the cover 42*a* in a state of protruding axially inward and is electrically connected to the substrate 79 for primary coil.

The primary coil 80 is electrically connected to the substrate 79 for primary coil, and supported and fixed to the inner peripheral surface of the support cylinder part 44*a* configuring the cover 42*a*. On the other hand, the secondary coil 81 is externally fitted and fixed to the outer peripheral surface of the axially inner end portion of the accommodating cylinder part 61 supported and fixed to the inner side of the hub body 22. In this state, the primary coil 80 and the secondary coil 81 are arranged in a state of being overlapped in the radial direction via a minute clearance in the radial direction.

In order to supply the electric power to the acceleration sensors 52, 53 and 54 and the tire side and wheel side sensors by the wireless power supply device 78 having the above configuration, a current from a vehicle body side is supplied to the connector part 84. Further, the current supplied from the vehicle body side is supplied to the primary coil 80 which is a power-transmission side via the substrate 79 for primary coil. Thereby, magnetic flux is generated, and a current is induced in the secondary coil 81 which is a power-receiving side. The induced current generated in this manner is supplied to the acceleration sensors 52, 53 and 54 and the tire side and wheel side sensors.

In the present embodiment having the above configuration, unlike the case of using the electric power generated by the electric generator 12 in the first embodiment, since it is possible to supply the stable electric power from the vehicle body side regardless of the traveling state, the stable electric power can be supplied to each of the sensors by the wireless power supply device 78. Therefore, in the present embodiment, the battery 14 (refer to FIG. 4) having the electricity storage function is omitted. Even when using a sensing device with high power consumption on the vehicle wheel side (rotation ring side), it is possible to supply the electric power using a small electric transmission device as compared with the power generation method using the electric generator 12. Further, when implementing the present invention, a resonance type wireless power supply device may be also used instead of the electromagnetic induction type wireless power supply device described above.

Other configurations and operational effects of the present embodiment are the same as those in the first embodiment.

[Seventh Embodiment]

Figure 16:
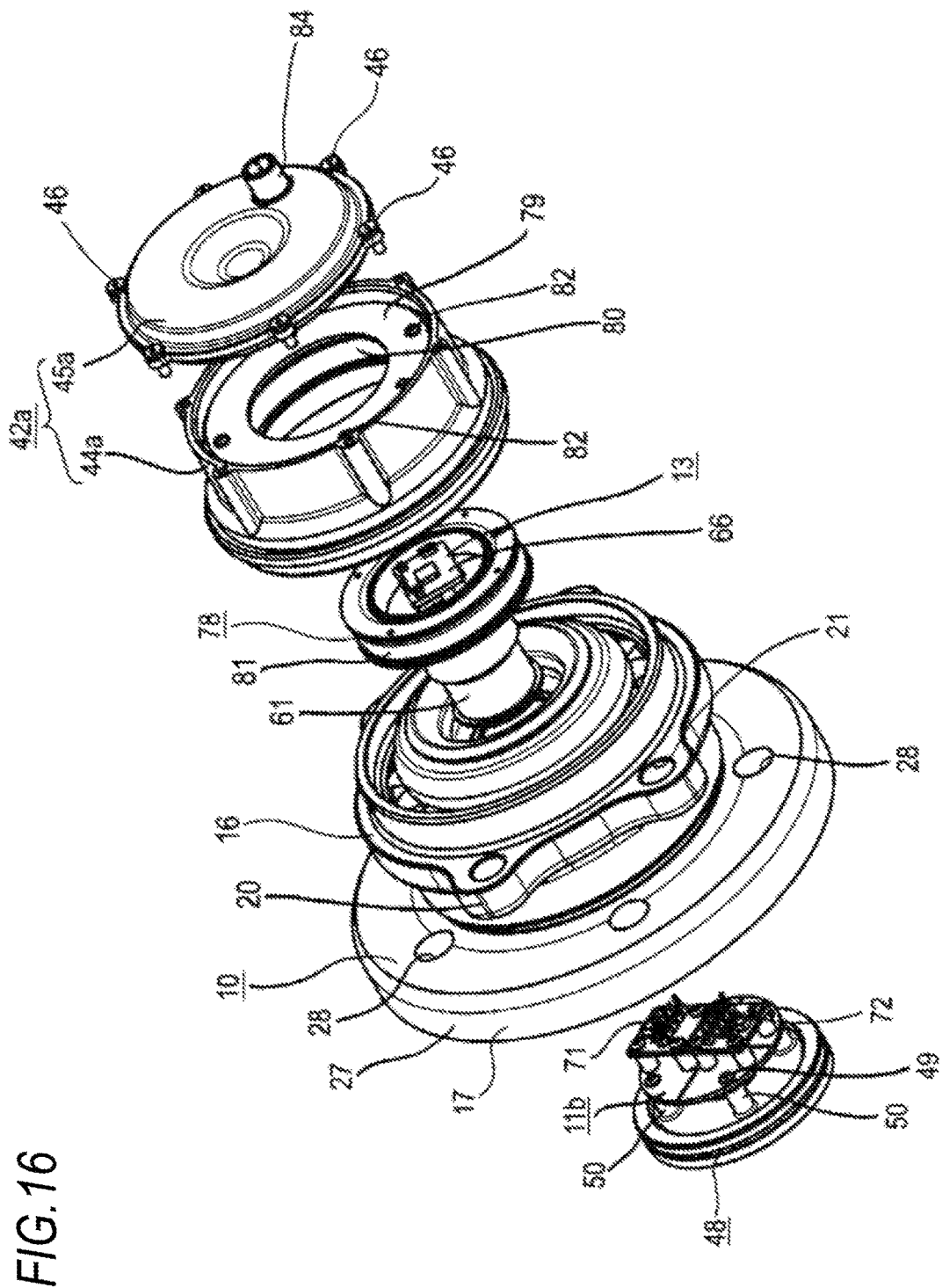
FIG. 16 is a view showing a seventh embodiment of the present invention and corresponding to FIG. 11.

A seventh embodiment of the present invention will be described with reference to FIG. 16. In the present embodiment, for the structure of the fourth embodiment, similarly to the sixth embodiment, the wireless power supply device 78 is used instead of the electric generator 12 (refer to FIGS. 10 and 11).

Other configurations and operational effects of the present embodiment are the same as those in the fourth and sixth embodiments.

[Eighth Embodiment]

Figure 17:
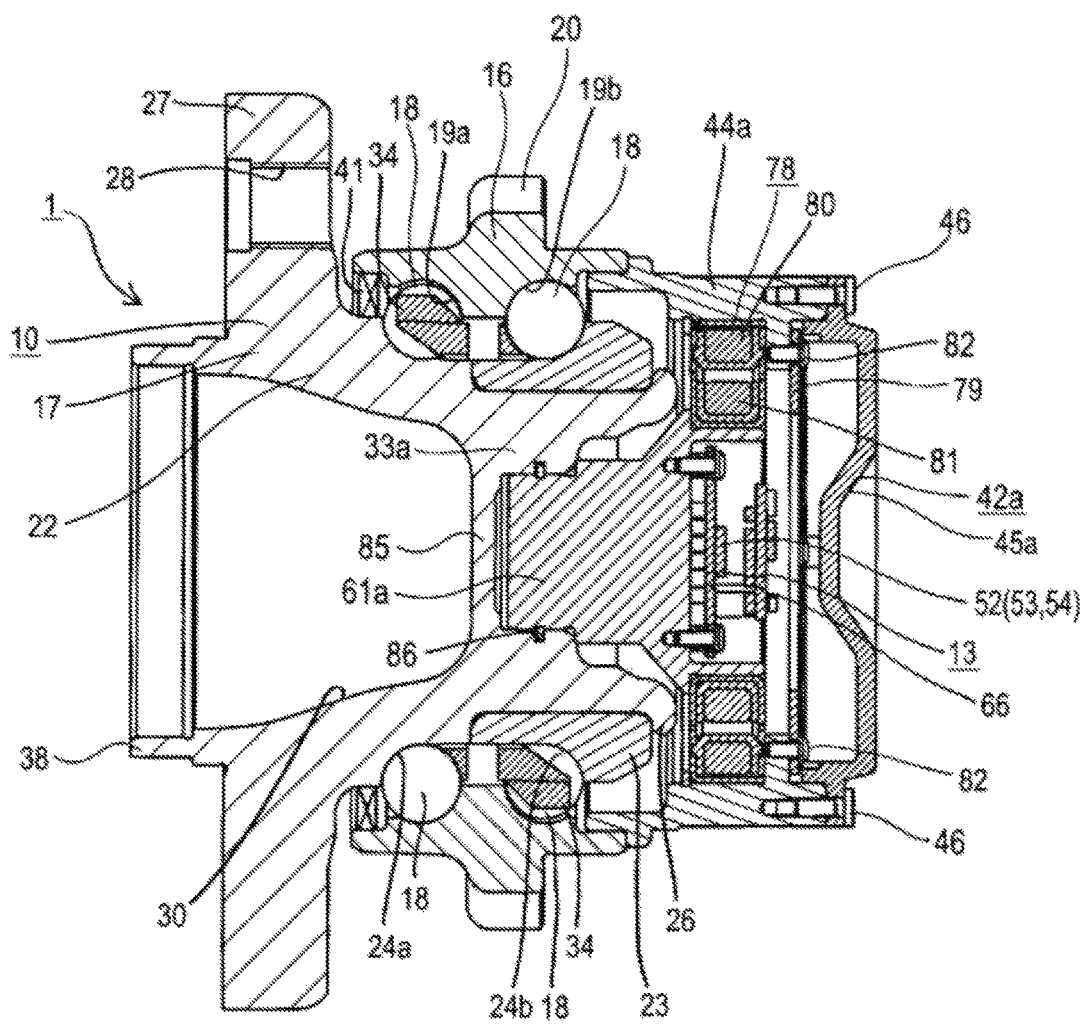
FIG. 17 is a view showing an eighth embodiment of the present invention and corresponding to FIG. 13.

An eighth embodiment of the present invention will be described with reference to FIG. 17. In the present embodiment, for the structure of the fifth embodiment, similarly to the sixth and seventh embodiments, the wireless power supply device 78 is used instead of the electric generator 12 (refer to FIG. 13). In the present embodiment having the above configuration, there is not provided with a function of supplying the electric power obtained by the wireless power supply device 78 to the tire side and wheel side sensors, and a function of communicating signals between the tire side and wheel side sensors and the wireless communication device 13. Since the battery 14 (refer to FIG. 13) is not provided, a partition wall part 85 is provided at the axially intermediate portion (axially outer end portion of an inward flange part 33*a*) of the inner peripheral surface of a hub body 22*a*. Therefore, it is possible to apply the same sealing structure as that of the bearing unit for a driven wheel which has been conventionally used. For example, it is not necessary to close the axially outer end opening of an inside space of the hub body 22*a* with a cap. In the present embodiment, as an accommodating cylinder part 61*a* supporting the secondary coil 81 configuring the wireless power supply device 78, one having a solid state from the axially outer end portion to the intermediate portion is used. An axially outer end portion of the accommodating cylinder part 61*a* is internally fitted and fixed to the inner end portion or the intermediate portion in the axial direction of the inward flange part 33*a* (an axially inner side portion of the partition wall part 85), and is locked with a retaining ring 86.

Other configurations and operational effects of the present embodiment are the same as those in the fifth and sixth embodiments.

INDUSTRIAL APPLICABILITY

In the above embodiments, although the case where diameters and pitch circle diameters of both rows of the balls are equal to each other has been described, for example, it is also possible to adopt a configuration in which the diameters of the balls configuring the inner side (axially inner side) ball row is larger than those of the balls configuring the outer side (axially outer side) ball row, and the pitch circle diameter of the outer side ball row is larger than that of the inner side ball row. It is also possible to secure a larger volume of a space of the outer end side large-diameter part (increase a capacity of a battery to be stored therein) by adopting such a configuration. Further, the present invention can be applied not only to a bearing unit for a driven wheel, but also to a bearing unit for a driving wheel. Furthermore, as described in the above embodiments, the present invention can also be applied to a conventionally known vehicle wheel supporting rolling bearing unit which does not include the electric generator, the charger, the battery and the wireless communication device in the bearing unit.

Although the present invention has been described in detail with reference to particular embodiments, it should be appreciated for those skilled in the art that various changes and modifications can be made without departing from the spirit and scope of the present invention.

This application is based on a Japanese Patent Application No. 2015-210715 filed on Oct. 27, 2015 and a Japanese Patent Application No. 2015-237378 filed on Dec. 4, 2015, the contents of which are incorporated herein by reference.

DESCRIPTION OF REFERENCE NUMERALS 1, 1a vehicle wheel supporting rolling bearing unit
2 tire
3 wheel
4 disc brake device
5 rotor
6 knuckle
7 vehicle body
8 upper arm
9 lower arm
10 bearing part
11, 11a, 11b acceleration measuring device
12 electric generator
13 wireless communication device
14 battery
15 charger
16 outer ring
17 hub
18 ball
19a, 19b outer ring raceway
20 stationary side flange
21 attachment hole
22 hub body
23 inner ring
24a, 24b inner ring raceway
25 small-diameter step part
26 crimping part
27 rotation side flange
28 coupling hole
29 through hole
30 outer end side large-diameter part
31 small-diameter part
32 inner end side large-diameter part
33, 33a inward flange part
34 cage
35 support hole
36 knuckle side attachment hole
37 coupling member
38 positioning cylinder part
39 coupling member
40 caliper
41 seal ring
42, 42a cover
43 internal space
44, 44a support cylinder part
45, 45a bottom part
46 bolt
47 outward flange part
48 cap with connector
49 bolt
50 attachment cylinder part
51 substrate
52 first acceleration sensor (uniaxial acceleration sensor)
53 second acceleration sensor (uniaxial acceleration sensor)
54, 54a third acceleration sensor (uniaxial acceleration sensor)
55 stator
56 rotator
57 support ring
58 permanent magnet
59 retaining ring
60 stator core
61, 61a accommodating cylinder part
62 small-diameter cylinder part
63 large-diameter cylinder part
64 locking ring
65 calculator
66 wireless communication circuit
67 bolt
68 battery case
69 connector part
70 fourth acceleration sensor
71 triaxial acceleration sensor
72 triaxial acceleration sensor
73 rotation angle detection device
74 encoder
75 reflection type light receiving sensor
76 attachment bracket
77 coil
78 wireless power supply device
79 substrate for primary coil
80 primary coil
81 secondary coil
82 attachment bolt
83 inward flange part
84 connector part
85 partition wall part
86 retaining ring

The invention claimed is:

1. A vehicle wheel supporting rolling bearing unit comprising:
an outer diameter side bearing ring member having an outer ring raceway on an inner peripheral surface;
an inner diameter side bearing ring member having an inner ring raceway on an outer peripheral surface; and
a plurality of rolling elements rollably provided between the outer ring raceway and the inner ring raceway,
wherein one of the outer diameter side bearing ring member and the inner diameter side bearing ring member is a stationary side bearing ring member which is supported and fixed to a suspension device and non-rotatable in a use state, and the other bearing ring member is a rotation side bearing ring member which is coupled and fixed to a vehicle wheel and is configured to rotate together with the vehicle wheel, and
wherein a part of the rotation side bearing ring member is provided with at least three acceleration sensors including a first acceleration sensor, a second acceleration sensor, and a third acceleration sensor which are fixed on a virtual plane orthogonal to a center axis of the rotation side bearing ring member, the first acceleration sensor and the second acceleration sensor are arranged on a virtual line passing through a rotation center of the rotation side bearing ring member with a same distance from the rotation center in a state where detection directions thereof are directed in a radial direction of the rotation side bearing ring member and are opposite to each other in the radial direction, and the third acceleration sensor is arranged such that a detection direction thereof is non-parallel to the detection directions of the first acceleration sensor and the second acceleration sensor.

2. The vehicle wheel supporting rolling bearing unit according to claim 1,
wherein the detection direction of the third acceleration sensor is arranged to be directed in the radial direction of the rotation side bearing ring member.

3. The vehicle wheel supporting rolling bearing unit according to, claim 1,
wherein the third acceleration sensor is arranged on a second virtual line which passes through the rotation center and is orthogonal to the virtual line on which the first acceleration sensor and the second acceleration sensor are arranged.

4. The vehicle wheel supporting rolling bearing unit according to claim 3,
wherein a distance from the rotation center to the third acceleration sensor is equal to the distance from the rotation center to the first and second acceleration sensors.

5. The vehicle wheel supporting rolling bearing unit according to claim 4, further comprising:
a fourth acceleration sensor,
wherein the third acceleration sensor and the fourth acceleration sensor are arranged on the second virtual line with a same distance from the rotation center in a state where detection directions thereof are directed in the radial direction of the rotation side bearing ring member and are opposite to each other in the radial direction.

6. The vehicle wheel supporting rolling bearing unit according to claim 1 further comprising:
a rotation angle detection device configured to detect a rotation angle of the rotation side bearing ring member.

7. The vehicle wheel supporting rolling bearing unit according to claim 1, further comprising:
an electric generator which includes a stator and a rotator concentrically arranged with each other and is configured to generate electric power to be supplied to each of the acceleration sensors based on relative rotation between the stator and the rotator.

8. A vehicle wheel supporting rolling bearing unit comprising:
an outer diameter side bearing ring member having an outer ring raceway on an inner peripheral surface;
an inner diameter side bearing ring member having an inner ring raceway on an outer peripheral surface; and
a plurality of rolling elements rollably provided between the outer ring raceway and the inner ring raceway,
wherein one of the outer diameter side bearing ring member and the inner diameter side bearing ring member is a stationary side bearing ring member which is supported and fixed to a suspension device and non-rotatable in a use state, and the other bearing ring member is a rotation side bearing ring member which is coupled and fixed to a vehicle wheel and is configured to rotate together with the vehicle wheel, and
wherein a part of the rotation side bearing ring member is provided with at least two acceleration sensors including a first triaxial acceleration sensor and a second triaxial acceleration sensor which are fixed on a virtual plane orthogonal to a center axis of the rotation side bearing ring member, and the first triaxial acceleration sensor and the second triaxial acceleration sensor are arranged on a virtual line passing through a rotation center of the rotation side bearing ring member with a same distance from the rotation center in a state where a first detection direction among three detection directions of the first triaxial acceleration sensor and a first detection direction among three detection directions of the second triaxial acceleration sensor are directed in a radial direction of the rotation side bearing ring member and are opposite to each other in the radial direction.

* * * * *